United States Patent
Omori et al.

(10) Patent No.: US 8,133,576 B2
(45) Date of Patent: Mar. 13, 2012

(54) COATED CUTTING INSERT AND MANUFACTURING METHOD THEREOF

(75) Inventors: Naoya Omori, Itami (JP); Yoshio Okada, Itami (JP); Minoru Itoh, Itami (JP); Norihiro Takanashi, Itami (JP); Shinya Imamura, Itami (JP); Susumu Okuno, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 710 days.

(21) Appl. No.: 11/792,078

(22) PCT Filed: Nov. 25, 2005

(86) PCT No.: PCT/JP2005/021704
§ 371 (c)(1),
(2), (4) Date: Jun. 1, 2007

(87) PCT Pub. No.: WO2006/059551
PCT Pub. Date: Jun. 8, 2006

(65) Prior Publication Data
US 2007/0298230 A1    Dec. 27, 2007

(30) Foreign Application Priority Data
Dec. 3, 2004  (JP) .................................. 2004-351705

(51) Int. Cl.
*B23B 27/14*  (2006.01)
(52) U.S. Cl. .......... 428/212; 428/98; 428/698; 407/113; 407/114; 407/115; 407/118; 407/119
(58) Field of Classification Search .................. 428/212, 428/98
See application file for complete search history.

(56) References Cited

U.S. PATENT DOCUMENTS

| 5,250,367 A |   | 10/1993 | Santhanam et al. |
| 5,364,209 A |   | 11/1994 | Santhanam et al. |
| 5,709,907 A | * | 1/1998  | Battaglia et al. ........... 427/126.1 |
| 5,861,210 A |   | 1/1999  | Lenander et al. |

(Continued)

FOREIGN PATENT DOCUMENTS

JP  55-100978  8/1980

(Continued)

OTHER PUBLICATIONS

European Search Report issued in European Patent Application No. 05809750.2-1262, mailed Jul. 2, 2010.

(Continued)

*Primary Examiner* — David Sample
*Assistant Examiner* — Laura Auer
(74) *Attorney, Agent, or Firm* — McDermott Will & Emery LLP

(57) ABSTRACT

A coated cutting insert according to the present invention includes a substrate, a base layer formed on the substrate, and an indicating layer formed on a part of the base layer. The base layer exhibits a color different from that of the indicating layer. The indicating layer is formed on the base layer, in at least a part of a surface including a cutting-edge portion and a rake face except for a flank face. When a surface relative roughness Ra of a breaker recess portion or a land portion of the rake face is set to Aμm and a surface relative roughness Ra of the flank face is set to Bμm, relation of B/A≦1 is established.

8 Claims, 7 Drawing Sheets

U.S. PATENT DOCUMENTS

| | | |
|---|---|---|
| 6,599,062 B1 | 7/2003 | Oles et al. |
| 2002/0039521 A1 | 4/2002 | Votsch et al. |
| 2002/0187370 A1 | 12/2002 | Yamagata et al. |
| 2003/0104254 A1* | 6/2003 | Westphal et al. ............. 428/698 |
| 2004/0242953 A1* | 12/2004 | Good ............................... 600/7 |
| 2005/0220546 A1 | 10/2005 | Yamagata et al. |

FOREIGN PATENT DOCUMENTS

| | | |
|---|---|---|
| JP | 58-55801 | 4/1983 |
| JP | 4-201103 | 7/1992 |
| JP | 8-52603 | 2/1996 |
| JP | 09-267202 | 10/1997 |
| JP | 2002-144108 | 5/2002 |
| JP | 2004-050385 | 2/2004 |
| KR | 10-2002-0026821 A | 4/2002 |
| KR | 10-2002-0043218 A | 6/2002 |
| WO | WO 02/04156 A1 | 1/2002 |

OTHER PUBLICATIONS

Japanese Office Action, with English translation, issued in Japanese Patent Application No. 2006-547863, mailed Jan. 18, 2011.

European Office Action issued in European Patent Application No. 05809750.2, dated Nov. 22, 2011.

Korean Office Action, with English abstract, issued in Korean Patent Application No. 10-2007-7003529, dated Nov. 18, 2011.

* cited by examiner

COATED CUTTING INSERT AND MANUFACTURING METHOD THEREOF

RELATED APPLICATIONS

This application is the U.S. National Phase under 35 U.S.C. §371 of International Application No. PCT/JP2005/021704, filed on Nov. 25, 2005, which in turn claims the benefit of Japanese Application No. 2004-351705, filed on Dec. 3, 2004, the disclosures of which Applications are incorporated by reference herein.

TECHNICAL FIELD

The present invention relates to a coated cutting insert used in a cutting tool for cutting process and a manufacturing method thereof. More specifically, the present invention relates to a coated cutting insert having a chip breaker formed on a rake face, the chip breaker aiming to break chips produced as a result of cutting and separated from a work material into appropriate small pieces, as well as to a manufacturing method thereof

BACKGROUND ART

A tool for turning or a tool for milling includes a single coated cutting insert or a plurality of coated cutting inserts. As shown in FIG. 1, such a coated cutting insert 1 includes a rake face 2 located on a side carrying chip 6 of a work material 5 in the cutting process and a flank face 3 located on a side opposed to the work material itself. Flank face 3 is structured to continue to rake face 2, with a cutting-edge portion 4 serving as a central point of application for cutting work material 5 lying therebetween.

In order to improve chip ejection performance, in many cases, convex and concave portions called chip breaker 7 are formed in rake face 2 (see FIG. 2). By forming such a chip breaker, the chips produced and separated from the work material are broken into appropriate small pieces, and risk (entanglement with the tool or the work material) due to long chips can be avoided. In addition, as chips at a high temperature due to cutting are immediately ejected, adhesion of the chips to a surface of the tool or to a surface of the work material as well as temperature increase in the surface of the tool can be prevented.

A cutting edge of such a coated cutting insert should be changed when the life of the tool ends. Here, in the case of an insert having a single cutting-edge portion, the insert itself should be changed. Meanwhile, a coated cutting insert having a plurality of cutting-edge portions can be used in such a manner that its orientation is changed several times so as to use its different cutting positions while using an identical datum plane, that is, an unused cutting-edge portion is brought to the cutting position. In some cases, the cutting-edge portion may be attached to another datum plane, where an unused cutting-edge portion may be used.

At a cutting worksite, however, in spite of presence of an unused cutting-edge portion, the coated cutting insert may be replaced, or its orientation may be changed. This is because whether or not the cutting-edge portion has been used is not recognized at the time when the cutting edge is changed or when the orientation of the cutting-edge portion is changed. Therefore, such an operation should be performed only after whether or not the cutting-edge portion has been used is well confirmed.

A coated cutting insert having a flank face and a rake face different in color from each other has been proposed as a method of readily identifying a used cutting-edge portion (Japanese Patent Laying-Open No. 2002-144108 (Patent Document 1)). Specifically, the coated cutting insert is structured such that a wear-resistant base layer called an antifriction coating layer is formed on a substrate and an indicating layer made from a material susceptible to wear is formed on the flank face.

The coated cutting insert structured as above attains an attention-drawing function indicating whether the cutting-edge portion has been used or not, however, the indicating layer formed on the flank face tends to adhere to the work material. Specifically, the indicating layer adheres to the surface of the work material or the work material adheres to the indicating layer, with the result that an uneven cutting edge is used in the cutting process. In such a case, appearance and surface smoothness of the work material after cutting is impaired.

In addition, if the indicating layer is provided on the flank face as in this coated cutting insert, it is difficult to identify which cutting-edge portion has been used when the insert is stored in a storage case or when the insert is placed on a workbench around a machine tool. Usually, the flank face has an area smaller than the rake face, and therefore the insert is stored in the storage case or placed on the workbench with the rake face facing upward, which makes it difficult to observe the flank face.

Patent Document 1: Japanese Patent Laying-Open No. 2002-144108

DISCLOSURE OF THE INVENTION

Problems to be Solved by the Invention

The present invention was made to solve the above-described problems. An object of the present invention is to provide a coated cutting insert effectively attaining an attention-drawing function for easy visual recognition without impairing appearance or surface smoothness of a work material as well as a method of manufacturing the same.

Means for Solving the Problems

In order to solve the above-described problems, the present inventors have conducted dedicated study of a contact state between the coated cutting insert and the work material in the cutting process. As a result, the present inventors have conceived that cutting-edge portion 4 of coated cutting insert 1 comes in contact with work material 5 and rake face 2 is located on the side of chips 6 as shown in FIG. 1, whereas flank face 3 faces work material 5, and that adhesion of the indicating layer to the surface of the work material after cutting might be prevented by forming the indicating layer on the side of rake face 2. The present invention was completed based on this concept and further study.

Specifically, the present invention is directed to a coated cutting insert including a substrate, a base layer formed on the substrate, and an indicating layer formed on a part of the base layer. The substrate includes at least one cutting-edge portion, at least one rake face, and at least one flank face. The flank face continues to the rake face with the cutting-edge portion lying therebetween. The rake face has a chip breaker formed, and adjacent to the cutting-edge portion, has a breaker recess portion inclined from the cutting-edge portion toward a central portion of the rake face to form a concave shape, or a land portion formed horizontally from the cutting-edge portion toward the central portion of the rake face. The base layer exhibits a color different from that of the indicating layer. The indicating layer is formed on the base layer, in at least a part of a surface including the cutting-edge portion and the rake face except for the flank face. When a surface relative roughness Ra of the breaker recess portion or the land portion of the rake face is set to Aμm and a surface relative roughness Ra of the flank face is set to Bμm, relation of B/A≦1 is established.

Preferably, at least one layer constituting the base layer has compressive residual stress in a portion on which the indicating layer is not formed, in at least a part of an area involved with cutting, and the compressive residual stress is stress of which absolute value is at least 0.1 GPa.

In addition, the present invention is directed to a coated cutting insert including a substrate, a base layer formed on the substrate, and an indicating layer formed on a part of the base layer. The substrate includes at least one cutting-edge portion, at least one rake face, and at least one flank face. The flank face continues to the rake face with the cutting-edge portion lying therebetween. The rake face has a chip breaker formed, and adjacent to the cutting-edge portion, has a breaker recess portion inclined from the cutting-edge portion toward a central portion of the rake face to form a concave shape, or a land portion formed horizontally from the cutting-edge portion toward the central portion of the rake face. The indicating layer is formed on the base layer, in at least a part of a surface including the cutting-edge portion and the rake face except for the flank face. The base layer exhibits a color different from that of the indicating layer, and at least one layer constituting the base layer has compressive residual stress in a portion on which the indicating layer is not formed, in at least a part of an area involved with cutting. Preferably, the compressive residual stress is stress of which absolute value is at least 0.1 GPa.

Preferably, the indicating layer may be formed in at least a part of an area of the rake face involved with cutting, and the indicating layer is a layer more susceptible to wear than the base layer.

Preferably, the coated cutting insert may have a plurality of cutting-edge portions available for use, and the substrate is formed from any one of cemented carbide, cermet, high-speed steel, ceramics, sintered cubic boron nitride, sintered diamond, sintered silicon nitride, and a mixture of aluminum oxide and titanium carbide.

Preferably, an outermost layer of the base layer is implemented by an $Al_2O_3$ layer or a layer containing $Al_2O_3$, and an outermost layer of the indicating layer is implemented by a layer formed from at least one metal (element) selected from the group consisting of IVa-group elements (Ti, Zr, Hf, and the like), Va-group elements (V, Nb, Ta, and the like) and VIa-group elements (Cr, Mo, W, and the like) in the periodic table, Al, Si, Cu, Pt, Au, Ag, Pd, Fe, Co, and Ni or an alloy containing that metal, or formed from a compound of at least one element selected from the group consisting of the IVa-group elements, the Va-group elements and the VIa-group elements in the periodic table, Al, and Si and at least one element selected from the group consisting of carbon, nitrogen, oxygen, and boron.

Preferably, the coated cutting insert is any one of a drill, an end mill, a coated insert for milling or turning, a metal saw, a gear cutting tool, a reamer, a tap, and an insert for crankshaft pin milling.

Moreover, the present invention is directed to a method of manufacturing a coated cutting insert including a substrate having a chip breaker, a base layer formed on the substrate and an indicating layer formed on a part of the base layer, including the steps of: forming the base layer on the substrate; forming the indicating layer on the base layer, which has a color different from that of the base layer; and removing the indicating layer formed in a prescribed area including at least a part of a flank face of the substrate.

The coated cutting insert according to the present invention includes at least one flank face, at least one rake face, and at least one cutting-edge portion. The indicating layer having a color different from that of the base layer formed on the substrate is provided in a prescribed portion on the side of the rake face.

Here, desirably, the indicating layer has such a color as creating great color contrast to the base layer. The indicating layer formed in the prescribed portion on the side of the rake face is configured such that it exhibits a clear trace after a cutting operation with the coated cutting insert for a time period as short as possible, for example for several seconds to several minutes, and it is at least partially worn to expose an underlying layer (that is, the base layer) having a different color. In a possible embodiment, preferably, the indicating layer has poor wear resistance, is more susceptible to wear than the base layer, and has weak adhesion strength to the base layer.

Meanwhile, color of the indicating layer may be changed immediately after the use of the coated cutting insert. Alternatively, color of the indicating layer may be changed (including a case in which it appears as if the color of the indicating layer had been changed) as a result of adherence of chips or adherence of cutting oil or the like.

In addition or instead, in order to indicate that the cutting-edge portion adjacent to the indicating layer has already been used, the indicating layer may change its color in a different manner. For example, the indicating layer may be thermosensitive, that is, color of the area is changed only in the vicinity of the cutting-edge portion at a temperature exceeding 200° C. Moreover, desirably, color change is based on oxidation or other chemical reaction, and is irreversible. Even in the case where the adjacent cutting-edge portion is used for a short period of time, if the temperature of the rake face area adjacent to the cutting-edge portion exceeds a prescribed temperature at least for a short period of time, color of the indicating layer is changed and such color change is clearly and permanently recognized. Color change due to thermal action is advantageous in that color change occurs not only in an area directly in contact with the work material during use but also in a wide area of the rake face in contact with chips at a high temperature, and hence the used cutting-edge portion can readily be identified.

Whether or not the coated cutting insert has already been used or which cutting-edge portion is unused can readily be identified in a simplified manner, based on whether a trace or color change has been caused in the indicating layer. Namely, the indicating layer attains the attention-drawing function. Accordingly, the coated cutting insert or its orientation can be changed as appropriate. Particularly, such disadvantages as being unaware of necessity of changing the already-used coated cutting insert, changing the unused coated cutting insert to a new one without using the same, setting the already-used cutting-edge portion at the cutting position in changing the orientation of the coated cutting insert, or leaving the unused cutting-edge portion as it is without using the same can be avoided. Therefore, according to the coated cutting insert of the present invention, maintenance of the cutting tool is significantly simplified.

The coated cutting insert according to the present invention not only attains such an attention-drawing function, but also achieves a pronounced function and effect in clearing the problem of poor appearance and surface smoothness of the work material after the cutting process as in the conventional art, because the indicating layer is formed on the rake face side. In the conventional coated cutting insert attaining the attention-drawing function, as the indicating layer is formed on the flank face, the work material adheres to the indicating layer, and therefore appearance of the work material after the cutting process as well as the surface relative roughness are deteriorated. In addition, as cutting resistance is increased, the cutting edge may be chipped, in which case not only a type or an application of the work material is limited, but also the cutting process using such a coated cutting insert may even become impossible. The present invention solves all these problems, and its industrial applicability is extremely wide.

In addition, in the coated cutting insert according to the present invention, when surface relative roughness Ra of the breaker recess portion or the land portion of the rake face is set to A$\mu$m and surface relative roughness Ra of the flank face is set to B$\mu$m, relation of B/A$\leq$1 is established. Accordingly, adhesion of the work material to the flank face can particularly effectively be prevented.

Moreover, the coated cutting insert according to the present invention is highly effective in that which cutting-edge portion has been used can readily be identified even when the insert is stored in the storage case or when the insert is placed on the workbench around the machine tool, because the indicating layer is formed on the rake face side.

Here, desirably, the indicating layer is formed to have a light color, for example, to have yellow or yellowish gloss (such as gold), while the base layer serving as the surface of the flank face is formed to be blackish. For example, such a base layer is desirably implemented by a coating layer of aluminum oxide ($Al_2O_3$). Another layer may be provided on and under the $Al_2O_3$ layer.

In this manner, the coated cutting insert according to the present invention can be formed by stacking layers, and here the $Al_2O_3$ layer implementing the base layer serves as a wear-resistant layer. The wear-resistant layer herein refers to a coating layer attaining a function to enhance wear resistance of the cutting edge when used in the cutting process, and thereby extending the life of the tool or improving the cutting speed.

Meanwhile, such a wear-resistant layer may carry an auxiliary surface layer. Alternatively, instead of the $Al_2O_3$ layer, a wear-resistant layer achieving the same or better performance may be provided.

In order to manufacture the coated cutting insert according to the present invention, initially, the coating layer including the $Al_2O_3$ layer as the wear-resistant layer is formed as the base layer on the entire surface of the substrate having the chip breaker. Then, as an uppermost layer, for example, a nitride layer (such as TiN) can be formed as the indicating layer. The nitride layer is formed to cover the entire surface of the base layer, and thereafter removed from the surface except for a prescribed portion of the rake face.

Particularly, the nitride layer used as the indicating layer should be removed from the flank face. Any method may be used for removal, however, for example, mechanical removal, more specifically brushing operation, barreling operation or blasting (sandblasting), may be performed.

As the brushing or blasting operation also serves for post-treatment of the flank face, coating on the flank face is smoothened. This contributes to less adhesion to the work material as well as to improvement in the life of the coated cutting insert.

EFFECTS OF THE INVENTION

Structured as described above, the coated cutting insert according to the present invention can effectively attain an attention-drawing function for easy visual recognition without impairing appearance or surface smoothness of a work material.

DESCRIPTION OF THE REFERENCE CHARACTERS

Figure 1:
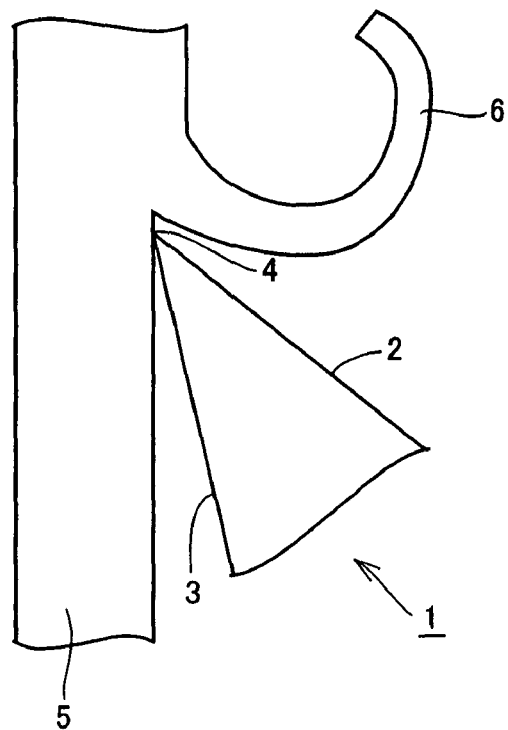
FIG. 1 is a diagram schematically showing a contact state between a coated cutting insert and a work material in a cutting process.

1 coated cutting insert; 2 rake face; 3 flank face; 4, 41, 42, 43 cutting-edge portion; 5 work material; 6 chip; 7 chip breaker; 8 substrate; 9 through hole; 10 breaker recess portion; 11 land portion; 12 base layer; 13 indicating layer; 14 coating; 16, 17 color-changed area; 18 central portion of breaker recess portion; and 19 prescribed portion in flank face.

BEST MODE FOR CARRYING OUT THE INVENTION

The present invention will be described hereinafter in further detail. An embodiment will be described with reference to the drawings, and those having the same reference characters allotted represent the same or corresponding elements. It is noted that each drawing is schematic and illustrative only, and a scale of a thickness of a coating and a substrate or a scale of curve (R) of a corner is different from an actual scale.

<Coated Cutting Insert and Substrate>

Figure 2:
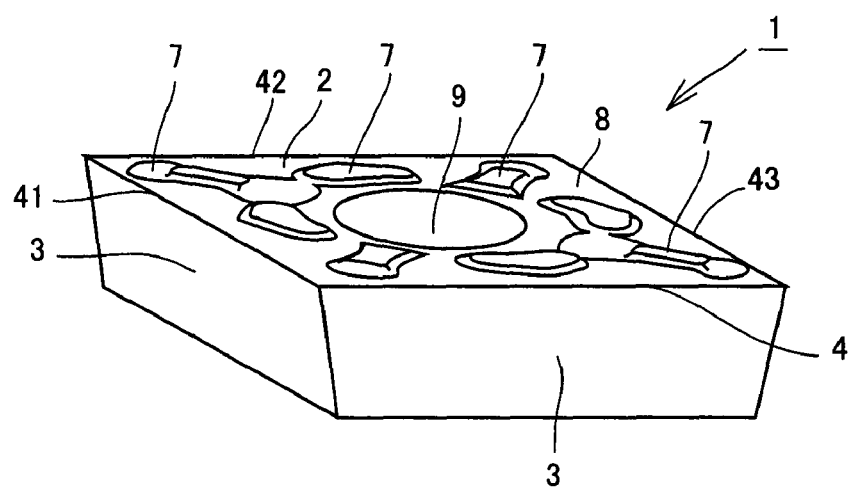
FIG. 2 is a schematic perspective view of one embodiment of the coated cutting insert according to the present invention prior to use.

The coated cutting insert according to the present invention includes a substrate, a base layer formed on the substrate, and an indicating layer formed on a part of the base layer. FIG. 2 shows coated cutting insert 1 formed to have a square-shaped upper surface. Coated cutting insert 1 has a substrate 8 in this manner, and for example, substrate 8 is preferably made of cemented carbide. For example, sintered tungsten carbide or other cemented carbide materials may be employed. Alternatively, substrate 8 may be formed from a ceramic material.

A conventionally known material for the substrate (base material) of the coated cutting insert may be used as the material for forming the substrate, without particularly limited. For example, cemented carbide (for example, WC-based cemented carbides, composed of WC alone or combination of WC and Co and/or carbonitride of Ti, Ta, Nb, or the like), cermet (mainly composed of TiC, TiN, TiCN, or the like), high-speed steel, ceramics (titanium carbide, silicon carbide, silicon nitride, aluminum nitride, aluminum oxide, or the like), sintered cubic boron nitride, sintered diamond, sintered silicon nitride, a mixture composed of aluminum oxide and titanium carbide, or the like is employed. In addition, the surface of the substrate (base material) may be reformed. For example, in the case of the cemented carbide, a beta (β) removal layer may be formed on its surface, or in the case of the cermet, a surface-hardened layer may be formed. Even if the surface is reformed in such a manner, the effect of the present invention is still obtained.

In addition, substrate 8 may have, for example, a polyhedral shape. For example, the polyhedron may have a shape having at least a bottom surface, a plurality of side surfaces and an upper surface as shown in FIG. 2, however, it is not limited as such. Namely, polyhedrons in any shape may be included. At least one of the surfaces of substrate 8 serves as the rake face which will be described later, and at least another surface serves as the flank face, the flank face continuing to the rake face with the cutting-edge portion (represented as a ridge where the flank face and the rake face intersect with each other in FIG. 2) lying therebetween.

In the coated cutting insert according to the present invention, a through hole 9 used as a fixing hole for attaching coated cutting insert I to the tool may be formed to penetrate the upper surface and the bottom surface. If necessary, in addition to or instead of the fixing hole, another fixing means may be provided.

Such a coated cutting insert according to the present invention is particularly useful as a drill, an end mill, a coated insert for milling or turning, a metal saw, a gear cutting tool, a reamer, a tap, and an insert for crankshaft pin milling.

It is noted that the present invention is also effective for the coated cutting insert of any of a negative type and a positive type.

<Rake Face, Flank Face and Cutting-Edge Portion>

The substrate has at least one cutting-edge portion, at least one rake face, and at least one flank face. The flank face continues to the rake face with the cutting-edge portion lying therebetween. Preferably, coated cutting insert 1 has a plurality of cutting-edge portions 4, 41, 42, 43 available for use as shown in FIG. 2, because time and trouble for changing the coated cutting insert itself after one cutting-edge portion is used can be saved. The expression "cutting-edge portion", "rake face" and "flank face" used herein refers to a concept encompassing not only a portion or a surface as an outermost portion of the coated cutting insert but also a corresponding portion such as a surface portion of the substrate and the surface portion and inside of each layer such as the base layer, the indicating layer, and the like.

The cutting-edge portion implements the central point of application for cutting the work material. Though cutting-edge portion 4 is formed linearly in FIG. 2 or the like, the cutting-edge portion is not limited as such. The cutting-edge portion may be arc, corrugated, curved, or zigzagged. The expression "cutting-edge portion" used herein refers not only to a portion corresponding to the ridge at which the rake face and the flank face intersect with each other (sharp edge) but also to a portion obtained by subjecting the sharp edge to cutting-edge treatment so as to have curve (R) (what is called a round-type honed edge), a beveled portion (what is called a chamfer-type honed edge), and a portion subjected to combined cutting-edge treatment and beveling.

Though flank face 3 is shown as a flat surface in FIG. 2, flank face 3 may be beveled as appropriate (divided into a plurality of surface areas), or may be in a shape different from the flat face or curved, or may include a chip breaker. In rake face 2, the chip breaker as described below is formed.

<Chip Breaker, Breaker Recess Portion and Land Portion>

Chip breaker 7 is formed in the rake face as shown in FIG. 2. The shape of the chip breaker is not limited as shown in FIG. 2, and any convex and concave shapes may be formed in order to attain satisfactory chip ejection performance. Means for forming the chip breaker is not particularly limited, and any conventionally known forming means may be adopted. What is called powder metallurgy process, in which a mold machined in advance to have a desired chip breaker shape is used to press-form a powder material and the powder material is subsequently sintered, is the most common method. In addition to this method, the chip breaker may be formed by subjecting the rake face of the substrate to laser beam machining, electric discharge machining, ultrasonic machining, abrasive polishing machining, or combination of these machining methods as appropriate.

Figure 3:
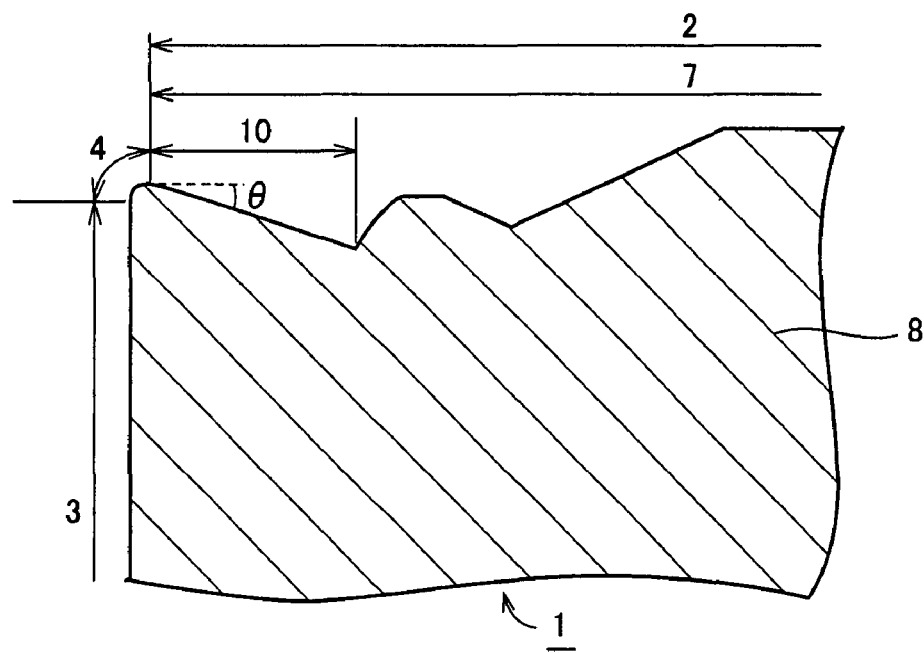
FIG. 3 is an enlarged cross-sectional view of an area in the vicinity of a breaker recess portion of a rake face.
Figure 4:
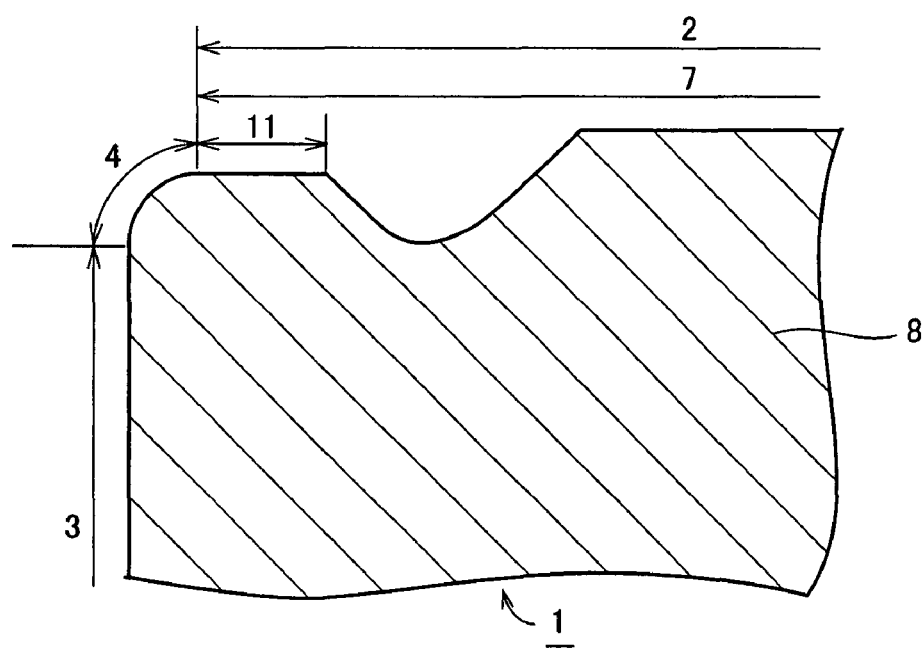
FIG. 4 is an enlarged cross-sectional view of an area in the vicinity of a land portion of the rake face.

As shown in FIGS. 3 and 4, adjacent to cutting-edge portion 4, the rake face includes a breaker recess portion 10 inclined from cutting-edge portion 4 toward a central portion of rake face 2 to form a concave shape, or a land portion 11 formed horizontally from cutting-edge portion 4 toward the central portion of rake face 2. Such breaker recess portion 10 and land portion 11 form a part of chip breaker 7. In other words, chip breaker 7 formed on rake face 2 is in a shape of any of breaker recess portion 10 and land portion 11, in the portion adjacent to cutting-edge portion 4. By adopting any of these shapes, satisfactory chip ejection performance is achieved. It is noted that breaker recess portion 10 inclined toward the central portion of the rake face to form a concave shape refers to inclination in a direction obliquely downward at an arbitrary angle $\theta(0°<\theta<90°)$ with respect to the horizontal direction of the rake face (see FIG. 3).

<Base Layer>

Figure 7:
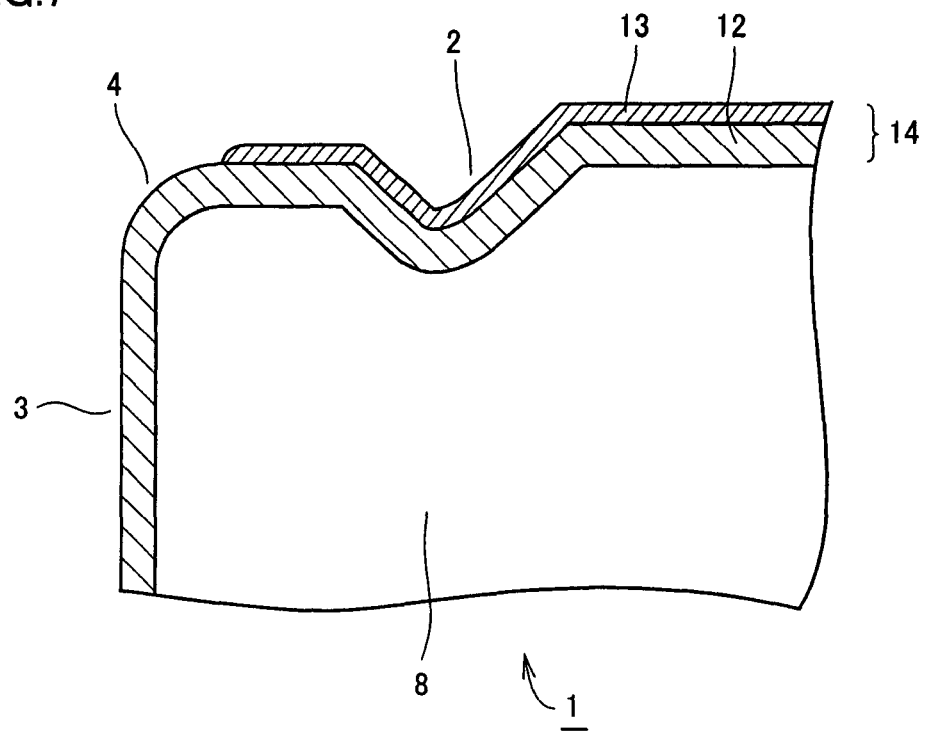
FIG. 7 is an enlarged cross-sectional view of an area in the vicinity of the cutting-edge portion of the coated cutting insert according to the present invention.

A base layer 12 formed on substrate 8 exhibits a color different from that of an indicating layer 13 which will be described later. FIG. 7 shows a structure of a coating 14 applied to coated cutting insert 1. Coating 14 includes base layer 12 extending along rake face 2 and flank face 3. In this manner, base layer 12 is formed on the surface of substrate 8, and base layer 12 may be formed at least on the flank face, and may be formed on both of the rake face and the flank face. In other words, particularly preferably, base layer 12 is formed on the entire surface of substrate 8.

More specifically, base layer 12 is exposed at the surface in the portion on which indicating layer 13 is not formed. Namely, in the portion where indicating layer 13 is not formed, base layer 12 serves as the surface.

Preferably, in base layer 12, at least one layer constituting base layer 12 has compressive residual stress in the portion on which indicating layer 13 is not formed (that is, the portion serving as the surface), in at least a part of the area involved with cutting. According to such a structure, toughness is provided and chipping of the cutting edge can significantly effectively be prevented. Here, the area involved with cutting refers to a region extending from the cutting-edge portion, to which the work material is normally in contact (or closest), toward the rake face side and the flank face side each with a width of 3 mm, although depending on a shape of the coated cutting insert, a type or a size of the work material, how the cutting process is performed, or the like. The compressive residual stress should only be provided to at least a part of such an area involved with cutting, and the compressive residual stress may be provided to solely one of, or both of, the rake face side and the flank face side.

The reason why such definition as at least a part of the area involved with cutting is made is that a case in which compressive residual stress is not provided to a part of such an area should also be encompassed, although the compressive residual stress is preferably provided to the entire area.

Here, the compressive residual stress used herein represents one type of internal stress (intrinsic strain) present in the coating (coating layer), and is expressed by a "−" (minus) numeric value (unit: "GPa" in the present invention). Therefore, the concept "large compressive residual stress" indicates that the absolute value of the numeric value above is large, whereas the concept "small compressive residual stress" indicates that the absolute value of the numeric value above is small. In this connection, tensile residual stress represents one type of internal stress (intrinsic strain) present in a coating layer, and is expressed by a "+" (plus) numeric value. It is assumed that the term "residual stress" covers both compressive residual stress and tensile residual stress.

The compressive residual stress of base layer 12 is stress of which absolute value is preferably at least 0.1 GPa, more preferably at least 0.2 GPa, and further preferably at least 0.5 GPa. If the absolute value is lower than 0.1 GPa, sufficient toughness may not be obtained. Meanwhile, though a larger absolute value is preferred from a point of view of providing toughness, the coating layer itself may peel off if the absolute value exceeds 8 GPa, which is not preferred.

At least one layer constituting the base layer in a region defined as above should have the compressive residual stress. More preferably, however, the layer implementing at least the outermost layer of the base layer suitably has the compressive residual stress, because the outermost layer having compressive residual stress is considered to contribute most to improvement in chipping resistance.

The residual stress may be measured with any method. For example, the residual stress can be measured with a $\sin^2\psi$ method using an X-ray stress measurement apparatus. Specifically, the residual stress can be measured in such a manner that stress at any 10 points included in the region in the base layer where compressive residual stress is provided (these points are preferably selected at a distance from each other by at least 0.1 mm, in order to represent the stress in that region of that layer) is measured with the $\sin^2\psi$ method, and the average thereof is calculated.

The $\sin^2\psi$ method using an X-ray is widely used as a method of measuring residual stress in a polycrystalline material, and the method described in detail on pages 54-66 of "X-ray Stress Measurement" (The Society of Materials Science, Japan, 1981, published by Yokendo Co., Ltd.) may be used.

Residual stress can also be measured utilizing a method using Raman spectroscopy. The Raman spectroscopy is advantageous in its ability of local measurement, that is, measurement for a narrow area such as an area having a spot diameter of 1 μm. For measuring the residual stress using the Raman spectroscopy, for example, a method described on pages 264-271 of "Technique for Evaluating Dynamic Property of Thin Film" (Sipec, published in 1992) can be adopted, although it is a common method.

Alternatively, residual stress can also be measured utilizing synchrotron radiation, in which case distribution of residual stress in a direction of thickness of the base layer (coating layer) can advantageously be found.

Base layer 12 can be formed using known chemical vapor deposition (CVD), physical vapor deposition (PVD), sputtering, or the like, and the forming method is not at all limited. For example, when coated cutting insert 1 is used as the drill or the end mill, the base layer is preferably formed with PVD, in which the base layer can be formed without lowering transverse rupture strength. Here, the thickness of the base layer is advantageously controlled by adjusting a time period for forming the layer.

If the base layer is formed using a known CVD method, the base layer preferably includes a layer formed with MT-CVD (medium temperature CVD). Particularly, it is optimal to include a titanium carbonitride (TiCN) layer which is excellent in wear resistance and formed with that method. In the conventional CVD method, the layer is formed at a temperature of approximately 1020 to 1030° C., whereas in the MT-CVD, the layer can be formed at a relatively low temperature of approximately 850 to 950° C. Accordingly, damage to the substrate due to heating in forming can be lowered. Therefore, the layer formed with MT-CVD is preferably provided proximate to the substrate. In addition, nitrile-based gas, particularly acetonitrile ($CH_3CN$), is preferred as a gas for forming, because of its good productivity. In some cases, a multilayer structure implemented by stacking a layer formed with MT-CVD as above and a layer formed with HT-CVD (high temperature CVD; the conventional CVD method mentioned above) may be preferred, because adhesive strength between the coating layers may be improved.

Meanwhile, the method of providing compressive residual stress to base layer 12 as above is not particularly limited. For example, if base layer 12 is formed with CVD, the region of the base layer to which compressive residual stress is provided is subjected to blasting after it is formed, thus providing the compressive residual stress. The region subjected to blasting may be wider, that is, may extend beyond the above-described region (the portion where indicating layer 13 is not formed (that is, the portion exposed as surface) and at least a part of the area involved with cutting). On the other hand, if base layer 12 is formed with PVD, compressive residual stress has already been provided at the time of forming, and therefore, the treatment as above is not necessary.

As described above, the method of providing compressive residual stress to base layer 12 includes the method of forming base layer 12 itself with PVD. Considering adhesiveness between base layer 12 and substrate 8, however, particularly preferably, base layer 12 itself is formed with CVD and compressive residual stress is provided through blasting.

Such blasting treatment can be performed after base layer 12 is formed, however, it is possible to once form indicating layer 13 which will be described later on the entire surface of base layer 12, and thereafter to perform blasting while removing indicating layer 13 from the region other than where indicating layer 13 should remain. By adopting such a treatment method, efficiency in producing the coated cutting insert is preferably improved. Here, the area where indicating layer 13 should remain is preferably masked with a jig or the like.

Here, blasting refers to a type of a surface treatment method for removing a coating, rust, dirt, and the like on the surface of an object to be treated as shown in (1) to (3) below, and blasting is utilized in many industrial fields.

(1) Particles of various abrasives are blown onto the surface of the object to be treated using compressed air.

(2) Particles of various abrasives are projected continuously onto the surface of the object to be treated using a rotor.

(3) A liquid (water) containing particles of various abrasives is blown onto the surface of the object to be treated at a high pressure.

Commonly used types of particles of various abrasives above include, for example, steel grit, steel shot, cut wire, alumina, glass bead, silica sand, and the like, and they may differently be called sandblasting, shot blasting, alumina blasting, glass bead blasting, and the like, depending on the type of particles.

For example, sandblasting represents a method of blowing abrasive particles of silica sand (powder) and the like onto the surface of the object to be treated using compressed air and the like, while shot blasting represents a method of using steel shots (normally in a spherical shape). In addition, wet blasting represents a method of blowing a liquid (water) containing abrasive particles onto the surface of the object to be treated at a high pressure.

A specific condition for blasting is different depending on a type of abrasive particles (abrasive grains) to be used or an application method. For example, a metal-based abrasive for blasting is defined under JIS Z0311:1996, and a non-metal-based abrasive for blasting is defined under JIS Z03 12:1996. Details of shot blasting are defined under JIS B6614:1998. Any of these conditions may be adopted for the treatment method using blasting in the present invention.

In addition to the blasting method as above, a brushing method, a shot peening method, a barrel method, an ion implantation method, and the like may also be adopted as the method of providing compressive residual stress to base layer 12.

Base layer 12 may be formed also by stacking a plurality of layers, and base layer 12 preferably attains a function as the wear-resistant layer. Base layer 12 can be formed from a compound of at least one element selected from the group consisting of the IVa-group elements, the Va-group elements and the VIa-group elements in the periodic table, Al, and Si and at least one element selected from the group consisting of carbon, nitrogen, oxygen, and boron, thus exhibiting excellent performance.

For example, as a layer formed from such a compound, base layer 12 may consist of, or include, the $Al_2O_3$ layer. A TiN layer may initially be formed on substrate 8, a TiCN layer may be formed on the TiN layer, and the $Al_2O_3$ layer may be formed on the TiCN layer. This three-layered structure as a whole implements base layer 12, and attains a function as the wear-resistant layer.

If base layer 12 is implemented by stacking a plurality of layers as described above, the outermost layer thereof is particularly preferably implemented by the $Al_2O_3$ layer or the layer containing $Al_2O_3$. This is because the $Al_2O_3$ layer or the layer containing $Al_2O_3$ is excellent as the wear-resistant layer and exhibits a blackish color (exactly speaking, the layer itself does not exhibit black color, but is likely to be affected by the color of the underlying layer; in the subject application, may sometimes simply be referred to as black), and particularly significant contrast can be created between the base layer and the indicating layer formed thereon.

Particularly preferably, the $Al_2O_3$ layer or the layer containing $Al_2O_3$ is exposed at the surface in the portion on which indicating layer 13 is not formed, in at least the part of the area involved with cutting, and has compressive residual stress in that region. This is because excellent wear resistance and toughness can both be achieved in an area most involved with chipping resistance. Here, the entire area involved with cutting more preferably has the compressive residual stress. The compressive residual stress is stress of which absolute value is preferably at least 0.1 GPa, more preferably at least 0.2 GPa, and further preferably at least 0.5 GPa. Though a larger absolute value is preferred from the point of view of providing toughness, the layer itself may peel off if the absolute value exceeds 8 GPa, which is not preferred. It is noted that a crystalline structure of $Al_2O_3$ composing the $Al_2O_3$ layer or the layer containing $Al_2O_3$ is not particularly limited, and $\alpha$-$Al_2O_3$, $\kappa Al_2O_3$, $\gamma$-$Al_2O_3$, or $Al_2O_3$ in an amorphous state as well as a state where these components are present in a mixed manner are included. Here, the layer containing $Al_2O_3$ refers to a layer containing at least $Al_2O_3$ as a part thereof (if $Al_2O_3$ is contained by at least 50 mass %, it is assumed that $Al_2O_3$ is contained), and the remainder may be composed of other compounds composing the base layer, $ZrO_2$, $Y_2O_3$ (also considered that Zr or Y is added to alumina), and the like, or may contain chlorine, carbon, boron, nitrogen, and the like.

Meanwhile, preferably, base layer 12 is exposed at the surface, in the region extending from cutting-edge portion 4 to the flank face 3 side with a width of less than 0.4 mm and in the region extending from cutting-edge portion 4 to the rake face 2 side with a width of less than 2 mm, and the surface of base layer 12 in the exposed portion is implemented by the $Al_2O_3$ layer or the layer containing $Al_2O_3$. According to such a structure, damage to the coating (coating layer) at the initial stage of cutting or abnormal damage at the intermediate stage of cutting can be suppressed, thus contributing to improvement in wear resistance and toughness.

As a compound that can be used other than (or along with) $Al_2O_3$ described above, specific examples of such compounds composing base layer 12 include TiCN, TiN, TiCNO, TiBN, $ZrO_2$, AlN, and the like. For example, the structure implemented by initially forming a TiN layer having a thickness of several μm on the entire surface of substrate 8, forming a TiCN layer having a thickness of several μm thereon, and forming the $Al_2O_3$ layer (or the layer containing $Al_2O_3$) having a thickness of several μm thereon can be a suitable example of base layer 12, which attains a function as the wear-resistant layer.

As a further suitable example, a layer formed from a compound of Ti and at least one element of nitrogen, oxygen and boron is formed as an underlying layer for the $Al_2O_3$ layer or the layer containing $Al_2O_3$. According to such a structure, particularly excellent adhesiveness between the $Al_2O_3$ layer or the layer containing $Al_2O_3$ and the underlying layer and hence higher wear resistance can be obtained. Specific examples of the compounds include TiN, TiBN, TiBNO, TiCBN, TiCNO, and the like. Suitable compounds other than these include compounds such as AlON, AlCNO, and the like.

By adopting the wear-resistant layer as base layer 12, the tool life of the coated cutting insert is remarkably extended. In addition, the coated cutting insert advantageously attains a function to withstand a further severe service environment such as higher cutting speed or the like. The wear-resistant layer serving as base layer 12 is formed at least on the flank face or on both of the rake face and the flank face, whereby the advantage can further effectively be enjoyed.

Base layer 12 preferably has a thickness from at least 0.05 μm to at most 20 μm. If the thickness is smaller than 0.05 μm, improvement in wear resistance is not observed. Meanwhile, if the thickness exceeds 20 μm, significant improvement in wear resistance is not observed, which is economically disadvantageous. If attention is not paid to cost efficiency, however, there is no harm in setting the thickness to 20 µm or greater, and the effect of the present invention is still achieved. The thickness can be measured, for example, by cutting the coated cutting insert and observing its cross-section with an SEM (scanning electron microscope).

<Indicating Layer>

The coated cutting insert according to the present invention is characterized in that the indicating layer having a color different from that of the base layer is formed on the base layer in at least a part of the surface including the cutting-edge portion and the rake face except for the flank face. The indicating layer may be formed with known chemical vapor deposition, physical vapor deposition, vacuum vapor deposition, plating, sputtering, or the like, and the forming method is not at all limited.

Figure 8:
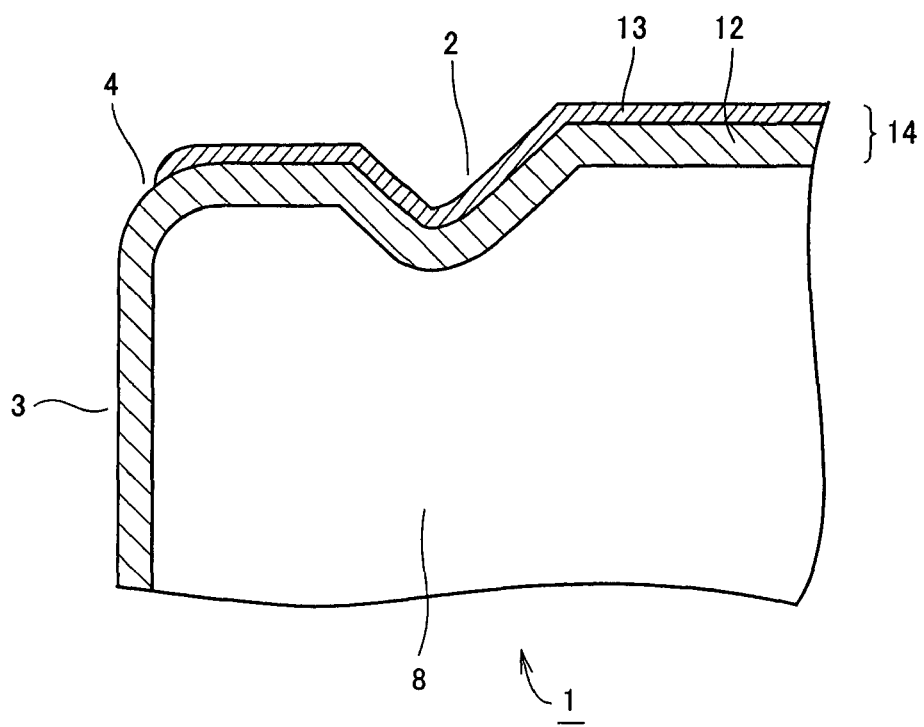
FIG. 8 is an enlarged cross-sectional view of the area in the vicinity of the cutting-edge portion of the coated cutting insert, of which indicating layer is formed in another manner.
Figure 9:
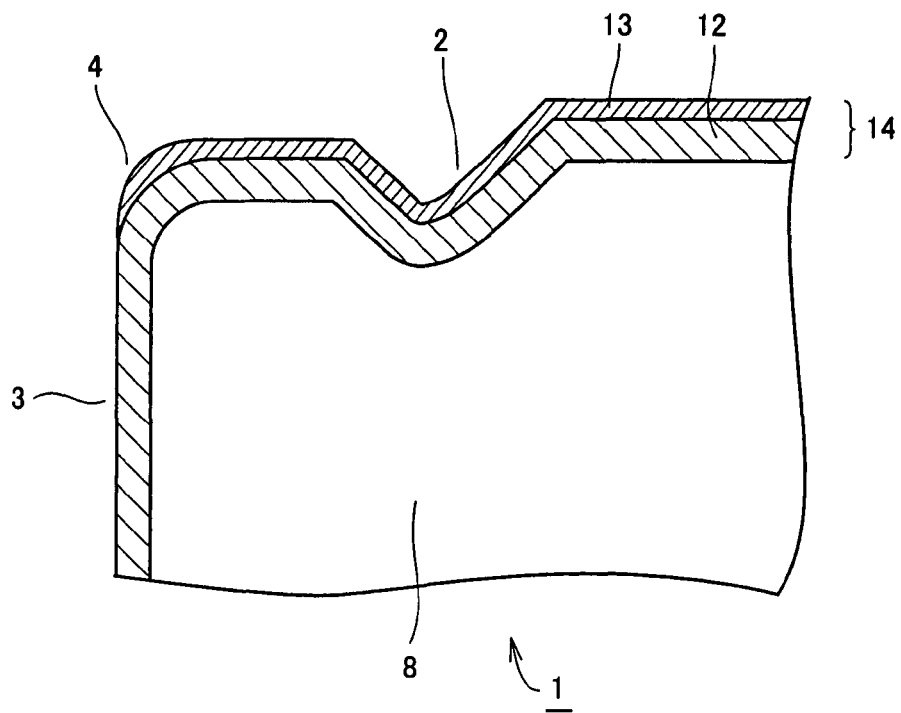
FIG. 9 is an enlarged cross-sectional view of the area in the vicinity of the cutting-edge portion of the coated cutting insert, of which indicating layer is formed in yet another manner.
Figure 10:
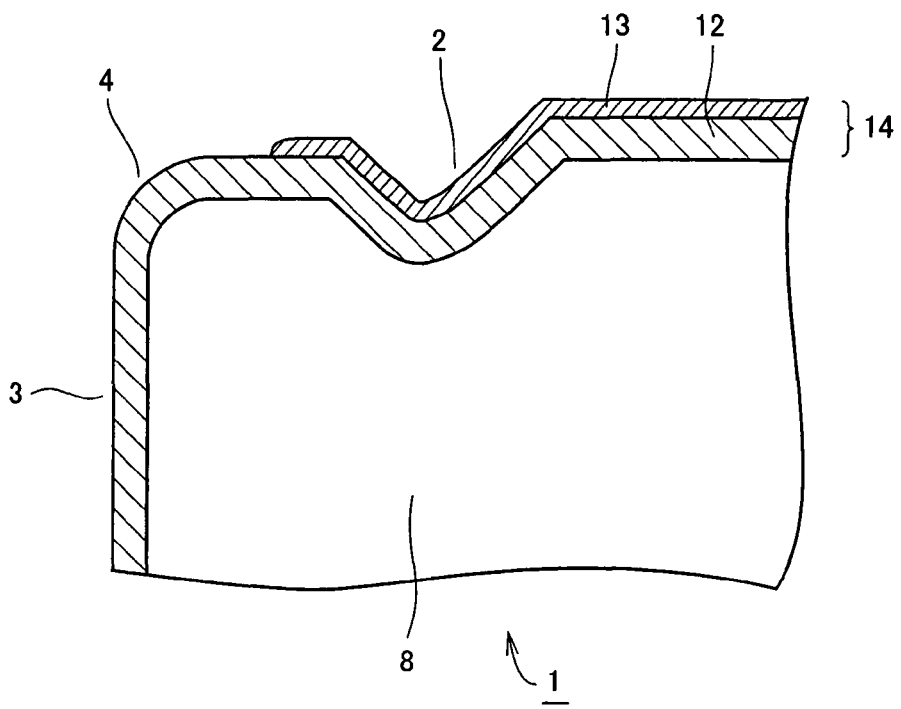
FIG. 10 is an enlarged cross-sectional view of the area in the vicinity of the cutting-edge portion of the coated cutting insert, of which indicating layer is formed in yet another manner.

Studying how the indicating layer according to the present invention is formed in the vicinity of the cutting-edge portion, various forming manners are included. For example, initially, such a manner that indicating layer 13 is formed on rake face 2 as far as immediately before cutting-edge portion 4 as shown in FIG. 7 is included. In addition, such a manner that indicating layer 13 is formed to extend almost as far as cutting-edge portion 4 as shown in FIG. 8 or such a manner that indicating layer 13 is formed to completely cover cutting-edge portion 4 and extend as far as immediately before the flank face as shown in FIG. 9 is included. Meanwhile, as shown in FIG. 10, such a manner that indicating layer 13 is formed at a small distance to cutting-edge portion 4 (though depending on the size of the cutting insert, a distance not significantly impairing an indicating function; for example, a distance of approximately 3.0 mm or smaller in the case of a cutting insert having an inscribed circle of 12.7 mm) is also included.

Particularly preferably, the indicating layer according to the present invention is formed in at least a part of the area involved with cutting of the rake face. Here, the area involved with cutting specifically refers to not only the cutting-edge portion but also a region including the area in the vicinity of the cutting-edge portion (a region extending from the cutting-edge portion toward the center of the rake face with a width of approximately 0 mm to 3 mm). Accordingly, whether the cutting-edge portion has been used or not can be identified in an ensured manner.

The reason why the portion where the indicating layer is formed is defined as "at least a part of the surface including the cutting-edge portion and the rake face" above is that, if only a part of the cutting-edge portion is involved with cutting, the attention-drawing function is attained merely by arranging the indicating layer only in the portion proximate to the portion involved with cutting, and it is not necessarily required to form the indicating layer occupying a large area to cover the entire surface of the cutting-edge portion and the rake face. Therefore, the indicating layer may be formed on the entire surface of the cutting-edge portion and the rake face, or formed solely on a part thereof. If the indicating layer is formed in the portion of the rake face where the chip breaker is formed, the indicating layer is formed on the chip breaker (see FIGS. 7 to 10; convex and concave shapes in rake face 2 in FIGS. 7 to 10 represent-chip breakers).

Indicating layer 13 is preferably a layer more susceptible to wear than base layer 12, because indicating layer 13 is readily removed in the cutting process so that use of that portion can readily be indicated by exposure of underlying base layer 12. In addition, removal of the indicating layer formed in a portion other than the rake face leads to facilitated manufacturing of the coated cutting insert itself.

As described above, indicating layer 13 exhibits a color different from that of base layer 12. By adopting such a structure, significant color contrast is ultimately created between the rake face and the flank face. This is because base layer 12 serving as the wear-resistant layer is normally formed on the surface of the flank face as described above. Indicating layer 13 is thus formed on rake face 2, so that impairment of appearance and surface smoothness of the work material resulting from adhesion of indicating layer 13 to the work material during the cutting process is not caused, and the attention-drawing function can be attained without such a disadvantage. The indicating layer may be formed on a part of the rake face, or may be formed on the entire surface of the rake face. As described above, the indicating layer according to the present invention is preferably formed in at least a part of the area of the rake face involved with cutting. It is noted that indicating layer 13 may be implemented by a single layer or by stacking a plurality of layers.

Here, indicating layer 13 is implemented by a single layer or a two or more layers formed from at least one metal (element) selected from the group consisting of the IVa-group elements, the Va-group elements and the VIa-group elements in the periodic table, Al, Si, Cu, Pt, Au, Ag, Pd, Fe, Co, and Ni or an alloy containing that metal, or formed from a compound of at least one element selected from the group consisting of the IVa-group elements, the Va-group elements and the VIa-group elements in the periodic table, Al, and Si and at least one element selected from the group consisting of carbon, nitrogen, oxygen, and boron. Each of these components has a bright color and is preferred, because it can industrially readily be manufactured. Particularly, if two or more layers are stacked, the layer composed as described above is preferably formed as the outermost layer.

Particularly preferably, an outermost layer of the indicating layer is implemented by a layer formed from at least one metal selected from the group consisting of the IVa-group elements, the Va-group elements and the Via-group elements in the periodic table, Al, Si, Cu, Pt, Au, Ag, Pd, Fe, Co, and Ni, or a compound of at least one element selected from the group consisting of the IVa-group elements, the Va-group elements and the Via-group elements in the periodic table, Al, and Si and at least one element selected from the group consisting of carbon, nitrogen, oxygen, and boron. This is because the compound exhibits a particularly bright color such as yellow, pink, brass-color, gold, and the like, it is excellent in terms of design, and it can create clear contrast to the base layer. If the indicating layer is formed from a single layer, this layer serves as the outermost layer.

More specifically, the indicating layer can be formed from an element or a compound such as ZrN, TiCN, TiSiCN, TiCNO, VN, Cr, and the like, in addition to TiN as above.

Indicating layer 13 does not attain a strong function to improve wear resistance (that is, the indicating layer is preferably a layer susceptible to wear, and its wear resistance is poorer than that of the base layer), and has a relatively small thickness. Indicating layer 13 has a thickness of preferably at least 0.05 µm to at most 2 µm, and more preferably at least 0.1 µm to at most 0.5 µm. If the thickness is less than 0.05 µm, uniform coverage of the entire substrate is industrially difficult, which may result in uneven color and poor appearance. On the other hand, if the thickness exceeds 2 µm, there is not a great difference in the function as the indicating layer, and it is unexpectedly economically disadvantageous. The measurement method as in the case of the base layer can be adopted as the method of measuring the thickness.

Indicating layer 13 can have compressive residual stress, which contributes to improvement in toughness of the coated cutting insert. The compressive residual stress is stress of which absolute value is preferably at least 0.1 GPa, more preferably at least 0.2 GPa, and further preferably at least 0.5 GPa. If the absolute value is lower than 0.1 GPa, sufficient toughness may not be obtained. Meanwhile, though a larger absolute value is preferred from the point of view of providing toughness, the indicating layer itself may peel off if the absolute value exceeds 8 GPa, which is not preferred.

<Surface Relative Roughness Ra>

Particularly preferably, the flank face according to the present invention is smooth, in order to avoid adhesion of the work material. Such surface smoothness can be obtained by subjecting the surface of the flank face to mechanical treatment, such as brushing operation or blasting (sandblasting). Normally, the mechanical treatment is performed when the indicating layer formed on the base layer is removed, however, it can be performed onto the surface of the flank face as an independent treatment operation. Namely, the mechanical treatment can be performed onto the base layer formed in the flank face as the independent treatment operation. It is noted that the smoothness can be obtained not only through the mechanical treatment but also through chemical treatment or physical treatment, for example.

According to the study conducted by the present inventors, it has been found that particularly good resistance to adhesion to work material is obtained when surface relative roughness Ra of the breaker recess portion or the land portion of the rake face is set to A$\mu$m and surface relative roughness Ra of the flank face is set to B$\mu$m and when relation of B/A$\leq$1 is established. More preferably, relation of B/A$\leq$0.8 is established, and further preferably, relation of B/A$\leq$0.7 is established.

The indicating layer may be formed on the surface of the breaker recess portion or the land portion in the rake face which is the region for which the surface relative roughness is defined, or the base layer may be exposed at the surface without the indicating layer being formed. Naturally, the surface of the flank face which is the region for which the surface relative roughness is defined is implemented by the base layer.

Here, surface relative roughness Ra refers to a kind of a numeric value representing surface roughness, and is called center line average (JIS B0601). The method of measuring the surface relative roughness is not particularly limited, and any known measurement method can be adopted. For example, a contact method (such as stylus method and the like), a non-contact method (such as a laser microscope method and the like), or a method of directly observing the cross-section of the coated cutting insert with a microscope may be employed.

As to a site where measurement should be performed, in each of the breaker recess portion or the land portion, measurement is preferably performed in the central portion of each portion, while in the flank face, measurement is preferably performed at a site distant from the cutting-edge portion by approximately 0 mm to 3 mm toward the central portion of the flank face.

<Method of Manufacturing Coated Cutting Insert>

According to the present invention, the method of manufacturing the coated cutting insert including the substrate having the chip breaker, the base layer formed on the substrate, and the indicating layer formed on a part of the base layer, includes the steps of forming the base layer on the substrate; forming the indicating layer on the base layer, which has a color different from that of the base layer; and removing the indicating layer formed in a prescribed area including at least a part of the flank face of the substrate. Accordingly, the coated cutting insert can be manufactured with high productivity.

Though indicating layer 13 is once formed on base layer 12 in manufacturing coated cutting insert 1, indicating layer 13 is subsequently removed from the region other than at least a part of the surface including the cutting-edge portion and the rake face (that is, the region where the indicating layer is formed). The effect of the present invention is obtained even if the indicating layer is removed from a portion except for at least a part of the area involved with cutting. In order to more readily identify the used cutting-edge portion, however, the indicating layer is preferably removed from the entire surface of the flank face. In this manner, the coated cutting insert having great color contrast between the rake face and the flank face as above can be manufactured.

Any of a chemical method, a physical method and a mechanical method may be adopted as the method of removing indicating layer 13 from the flank face. Preferably, the physical or mechanical method such as removal by brushing or other wear such as removal using sandblasting (blasting) may be adopted. In addition, as described previously, blasting is also effective to smoothen base layer 12 that has thus been exposed again.

The method of manufacturing the coated cutting insert according to the present invention may further include the step of subjecting the flank face to smoothening treatment (including a case in which this step is performed simultaneously with the step of removing the indicating layer). The smoothening treatment is preferably performed such that relation of B/A$\leq$1 is established when surface relative roughness Ra of the breaker recess portion or the land portion of the rake face is set to A$\mu$m and surface relative roughness Ra of the flank face is set to B$\mu$m. This can ensure appearance and surface smoothness of the work material after the cutting process.

Any of the chemical method, the physical method and the mechanical method may be adopted as the smoothening treatment. Preferably, the physical or mechanical method such as brushing or other wear such as polishing using sandblasting (blasting) may be adopted.

<Function Etc.>

Coated cutting insert 1 described above has rake face 2 which is intact in an unused state, as shown in FIG. 2. Particularly, when the indicating layer is formed on the entire surface of the rake face, the entire surface of the rake face continuing to cutting-edge portions 4, 41 maintains the original color of the indicating layer, which indicates that cutting-edge portions 4, 41 are unused. For example, if rake face 2 is coated with TiN, a part of indicating layer 13 continuing to cutting-edge portions 4, 41 is in a bright brass color (gold) in the unused state. In contrast, flank face 3 from which the indicating layer has been removed is composed of $Al_2O_3$ which serves as base layer 12, and flank face 3 exhibits relatively blackish or substantially black appearance, the color representing the coated cutting insert.

In the description below, a case in which coated cutting insert 1 is attached to a main body of the cutting tool and cutting-edge portion 4 among a plurality of cutting-edge portions 4, 41, 42, 43 is used first is assumed. When the cutting tool is used, cutting-edge portion 4 immediately comes in contact with work material 5, and starts cutting of work material 5. Particularly, wear of coated cutting insert 1 is less in the area of cutting-edge portion 4 and flank face 3, by virtue of base layer 12.

When cutting with cutting-edge portion 4 is started, however, color of indicating layer 13 in the area adjacent to cutting-edge portion 4 is changed, and relatively great initial change is seen in the portion of rake face 2 adjacent to cutting-edge portion 4.

The color-changed area has a color different from that of indicating layer 13, and in some cases, base layer 12 much more blackish is seen.

Figure 5:
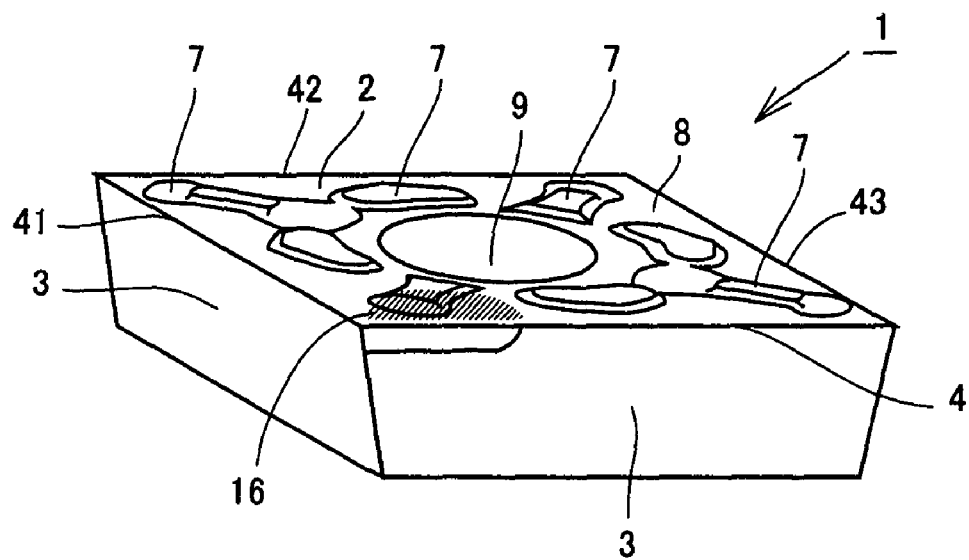
FIG. 5 is a schematic perspective view of the coated cutting insert according to the present invention after one cutting-edge portion is used.

Accordingly, as shown in FIG. 5, a blackish and color-changed area 16 continuing to cutting-edge portion 4 is created. Color-changed area 16 is immediately and readily identified, thus attaining the attention-drawing function. Color change occurs due to exposure of base layer 12 as described above, or may occur as a result of change caused by heat, for example, oxidation phenomenon.

For example, indicating layer 13 in the area adjacent to cutting-edge portion 4 has a tempered color as shown in FIG. 5, thus forming color-changed area 16. Such color change originates from temperature increase in the vicinity of the cutting-edge portion, that has resulted from cutting of the work material by cutting-edge portion 4.

Figure 6:
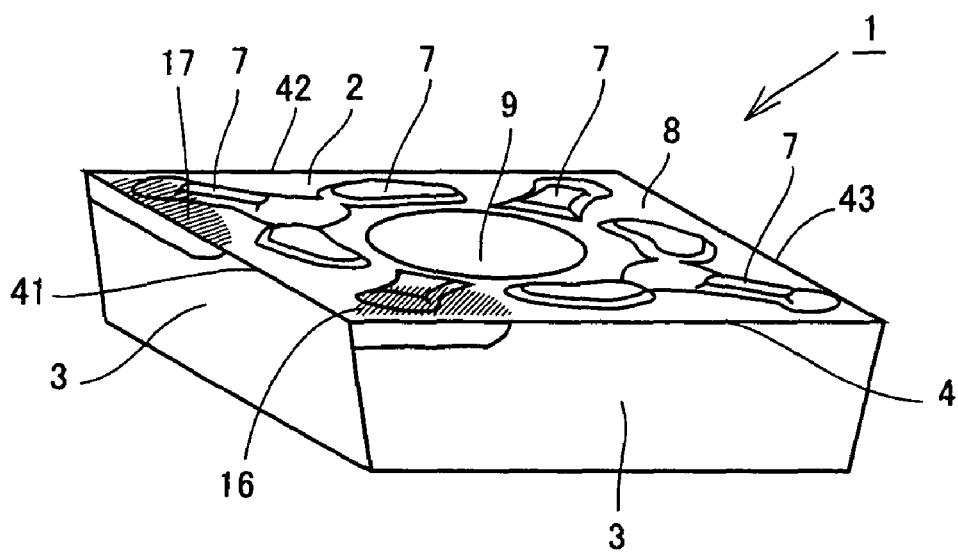
FIG. 6 is a schematic perspective view of the coated cutting insert according to the present invention after two cutting-edge portions are used.

After coated cutting insert 1 is used for a long time (a cutting position is changed), rake face 2 gives the appearance shown in FIG. 6. Here, after the cutting operation for first several minutes, appearance shown in FIG. 5 is already given. Therefore, for example, an operator can recognize at a glance that cutting-edge portion 4 has already been used and cutting-edge portion 41 has not yet been used. After cutting-edge portion 41 is used for the first time, appearance shown in FIG. 6 is given.

Here, color of indicating layer 13 in the area adjacent to cutting-edge portion 41 is changed, to create a color-changed area 17, thus indicating that cutting-edge portion 41 has been used.

It is noted that coated cutting insert 1 shown in FIGS. 2, 5 and 6 is a throw away coated cutting insert having four cutting-edge portions 4, 41, 42, 43 available for use. Which of cutting-edge portions 4, 41, 42, 43 has already been used and is unused can be identified at a glance by the color of indicating layer 13. Therefore, maintenance of the cutting tool equipped with such a coated cutting insert can be performed in a particularly simplified manner.

As described above, a composite coating 14 consisting of base layer 12 and indicating layer 13 is applied to coated cutting insert 1 (FIG. 7). Though the indicating layer is formed on a single rake face or on a plurality of rake faces, in a general coated cutting insert such as ISO-standard SNGN120408, the bottom surface or the upper surface serves as the rake face, while in an exceptional coated cutting insert other than the former, which is called "vertical use" or the like, the side surface serves as the rake face.

When cutting-edge portion 4, 41, 42, 43 adjacent to indicating layer 13 is used even for a short period of time, clear trace remains in indicating layer 13, and color of indicating layer 13 is changed or indicating layer 13 is altered. As indicating layer 13 is very sensitive, an underlying layer or material having a different color (that is, the base layer) may be seen. In this manner, indicating layer 13 creates clear color contrast or brightness contrast, so that the used cutting-edge portion can immediately be identified in a simplified manner.

If the coating which may be disadvantageous in terms of friction is applied on the rake face side, appearance and surface smoothness of the work material is impaired less than in a case in which the coating is applied to the flank face, and in addition, greater color contrast can be obtained. Use of the rake face as the indicating layer has thus proved particularly advantageous. In addition, when surface relative roughness Ra of the breaker recess portion or the land portion of the rake face is set to Aμm and surface relative roughness Ra of the flank face is set to Bμm and when relation of B/A≦1 is established, particularly good resistance to adhesion to the work material can be obtained. Moreover, as the indicating layer is formed on the rake face side, the coated cutting insert attains such an excellent function that which cutting-edge portion has been used can readily be identified even when the coated cutting insert is stored in the storage case or placed on the workbench.

EXAMPLES

In the following, the present invention will be described in detail with reference to examples, however, the present invention is not limited thereto.

Example 1

Raw material powders having a composition of 87 mass % WC, 2.5 mass % TaC, 1.0 mass % NbC, 2.0 mass % TiC and 7.5 mass % Co were pressed, and successively sintered for one hour at a temperature of 1400° C. in a vacuum atmosphere. Thereafter, the resultant sintered object was subjected to planar polishing treatment and cutting-edge treatment, thus fabricating an insert made of cemented carbide in a shape the same as that of cutting insert CNMG120408N-GU (manufactured by Sumitomo Electric Hardmetal Corp.). This insert was employed as the substrate. The substrate had 8 cutting-edge portions, 2 rake faces, and 4 flank faces. In addition, the rake face had the chip breaker formed, and adjacent to the cutting-edge portion, had the breaker recess portion inclined from the cutting-edge portion toward the central portion of the rake face to form a concave shape. The beta (β) removal layer was not formed on the surface of the substrate.

Layers listed below were successively formed on the entire surface of the substrate with known thermal CVD. Specifically, the substrate surface was coated successively with TiN having a thickness of 0.5 μm, TiCN (MT-CVD) having a thickness of 5.5 μm, a-alumina ($Al_2O_3$) having a thickness of 1.5 μm, and TiN having a thickness of 0.5 μm and serving as the outermost layer (total thickness 8.0 μm). In this coating (referred to as coating No. 1), TiN having a thickness of 0.5 μm (on the substrate surface side), TiCN having a thickness of 5.5 μm, and α-alumina ($Al_2O_3$) having a thickness of 1.5 μm served as the base layer, and TiN having a thickness of 0.5 μm as the outermost layer served as the indicating layer.

Similarly, coatings Nos. 2 to 6 in Table 1 below instead of coating No. 1 coated the entire surface of the substrate.

TABLE 1

| | Coating | | |
|---|---|---|---|
| No. | Base Layer | Indicating Layer | Total Thickness |
| 1 | TiN (0.5 μm)/TiCN (MT-CVD, 5.5 μm)/α-$Al_2O_3$ (1.5 μm) | TiN (0.5 μm) | 8.0 μm |
| 2 | TiC (0.4 μm)/TiCN (MT-CVD, 2.6 μm)/κ-$Al_2O_3$ (1.1 μm) | TiCN (0.4 μm) | 4.5 μm |
| 3 | TiN (0.4 μm)/TiCN (MT-CVD, 4.9 μm)/TiC (2.3 μm)/κ-$Al_2O_3$ (1.6 μm) | TiN (0.4 μm) | 9.6 μm |

TABLE 1-continued

| | | Coating | | |
|---|---|---|---|---|
| No. | Base Layer | | Indicating Layer | Total Thickness |
| 4 | TiN (0.2 μm)/ZrCN (3.6 μm)/ZrO$_2$ (0.5 μm)/α-Al$_2$O$_3$ (1.2 μm) | | ZrN (0.3 μm) | 5.8 μm |
| 5 | TiN (0.3 μm)/TiCN (MT-CVD, 6.2 μm)/TiBN (0.8 μm)/α-Al$_2$O$_3$ (4.8 μm) | | TiN (0.4 μm) | 12.5 μm |
| 6 | TiN (0.5 μm)/TiCN (MT-CVD, 5.5 μm)/α-Al$_2$O$_3$ (1.5 μm) | | CrN (0.3 μm) | 7.8 μm |

Layers of the base layer were stacked on the surface of the substrate, successively from the one in the left shown in Table 1 above. All layers were formed with known thermal CVD, except for the CrN layer in coating No. 6. The CrN layer was formed with ion plating.

Known blasting was used to perform the following 4 types of treatment methods A to D on the coated substrates. It is noted that, in each treatment method, the area where the indicating layer should remain was masked with a jig.

(Treatment Method A)

The coating was not subjected to treatment with blasting. Therefore, the surface of the substrate exhibited, on the entire surface, the color of the indicating layer (for example, in the case of coating No. 1, gold which is the color of TiN).

(Treatment Method B)

The coating was subjected to blasting, so as to remove the indicating layer on the rake face. Therefore, the flank face exhibited the color of the indicating layer (for example, in the case of coating No. 1, gold which is the color of TiN), and the rake face exhibited the color of the base layer (for example, in the case of coating No. 1, black which is the color of Al$_2$O$_3$).

(Treatment Method C)

The coating was subjected to blasting, so as to remove the indicating layer on the flank face. Therefore, the rake face exhibited the color of the indicating layer (for example, in the case of coating No. 1, gold which is the color of TiN), and the flank face exhibited the color of the base layer (for example, in the case of coating No. 1, black which is the color of Al$_2$O$_3$).

(Treatment Method D)

The coating was subjected to blasting, so as to remove the indicating layer on the entire surface of the substrate. Therefore, the entire surface of the substrate (both of the rake face and the flank face) exhibited the color of the base layer (for example, in the case of coating No. 1, black which is the color of Al$_2$O$_3$).

Twenty-seven types of coated cutting inserts Nos. 1 to 27 in Tables 2 and 3 below were thus manufactured. Nos. 3, 7, 11, 15, 19, 23, 25, 26, and 27 represent the examples of the present invention, and others represent comparative examples. Nos. 25 to 27 represent the cutting inserts obtained by modifying a condition for blasting for No. 19 so as to remove the indicating layer on the flank face with blasting.

Figure 11:
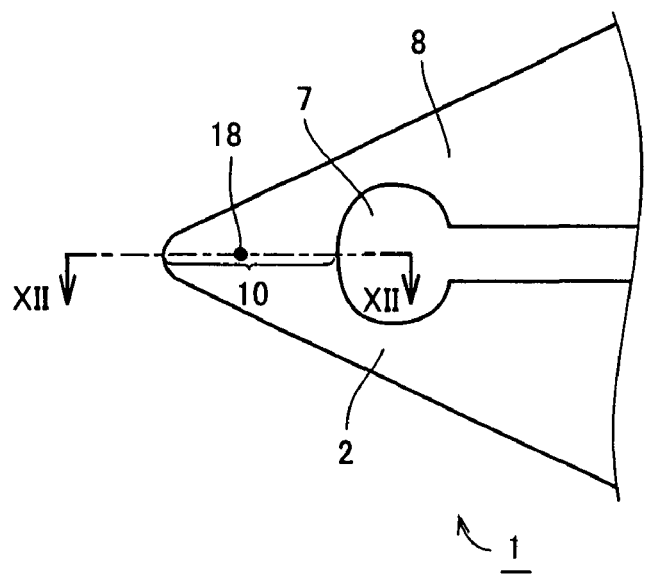
FIG. 11 is a schematic plan view of a cutting-edge corner portion of the coated cutting insert.
Figure 12:
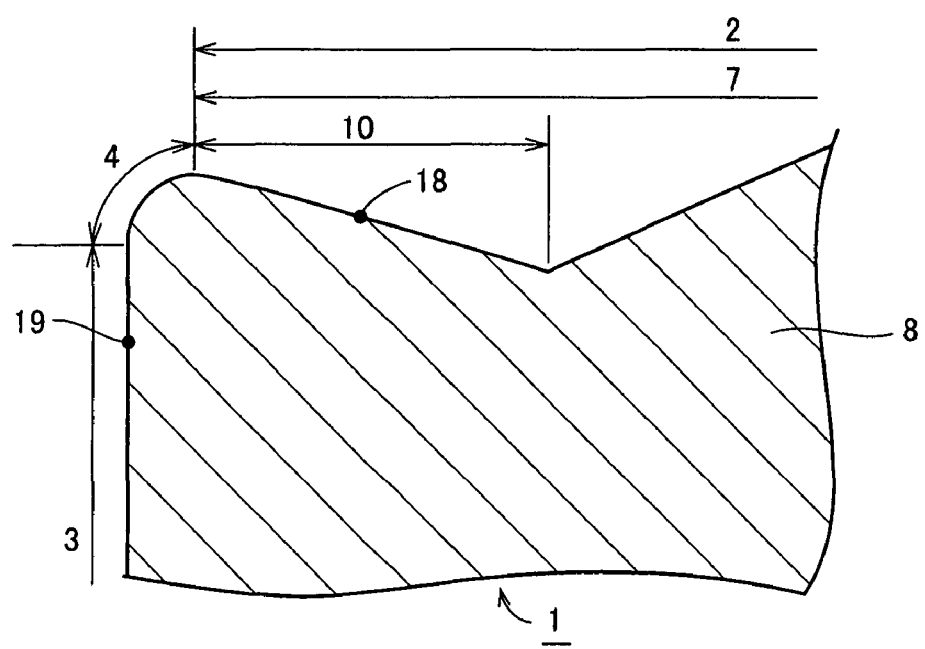
FIG. 12 is a schematic cross-sectional view of the cutting-edge corner portion of the coated cutting insert.

As to surface relative roughness Ra of each coated cutting insert, Tables 2 and 3 show the result (value of B/A) of measurement using a laser microscope (VK-8510, manufactured by Keyence Corporation). Specifically, surface relative roughness Ra (Aμm) of a central portion 18 of the breaker recess portion shown in the cross-section along the line XII-XII in FIG. 11 showing a plan view of the cutting-edge corner portion of the insert and surface relative roughness Ra (Bμm) of a prescribed portion 19 of the flank face (a point distant from the cutting-edge portion by 0.5 mm) were measured (see FIG. 12), and a measurement distance was set to 100 μm.

Then, these coated cutting inserts Nos. 1 to 27 were subjected to turning-cutting test under the conditions below, so as to measure the surface relative roughness of the work material and a flank face wear amount of the coated cutting insert. Tables 2 and 3 show the result. A smaller surface relative roughness of the work material (Rz: defined under JIS B0601 and measured with equipment complying with JIS B0651) indicates more favorable smoothness, and a smaller flank face wear amount indicates better wear resistance.

(Condition for Turning-Cutting Test)
Work material: SCM415
Cutting speed: 100 m/min
Feed: 0.15 mm/rev.
Depth of cut: 1.0 mm
Cutting oil: not used
Cutting time period: 40 minutes

TABLE 2

| | Coated cutting insert No. | Coating No. | Treatment Method | Surface Relative Roughness Ra (B/A) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
| | 1 | 1 | A | 1.4 | 0.114 | 5.9 | significant | cloudy | easy |
| | 2 | 1 | B | 1.5 | 0.111 | 4.8 | significant | cloudy | easy |
| * | 3 | 1 | C | 0.8 | 0.104 | 3.1 | none | close to mirror surface | easy |
| | 4 | 1 | D | 1.1 | 0.105 | 3.2 | none | close to mirror surface | difficult |
| | 5 | 2 | A | 1.3 | 0.147 | 5.4 | significant | cloudy | easy |
| | 6 | 2 | B | 1.6 | 0.141 | 4.6 | significant | cloudy | easy |
| * | 7 | 2 | C | 0.7 | 0.136 | 3.3 | none | close to mirror surface | easy |
| | 8 | 2 | D | 1.2 | 0.137 | 3.3 | none | close to mirror surface | difficult |
| | 9 | 3 | A | 1.4 | 0.103 | 6.0 | significant | cloudy | easy |
| | 10 | 3 | B | 1.7 | 0.095 | 4.9 | significant | cloudy | easy |
| * | 11 | 3 | C | 0.7 | 0.081 | 3.2 | none | close to mirror surface | easy |

TABLE 2-continued

| Coated cutting insert No. | Coating No. | Treatment Method | Surface Relative Roughness Ra (B/A) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|
| 12 | 3 | D | 1.1 | 0.080 | 3.3 | none | close to mirror surface | difficult |
| 13 | 4 | A | 1.4 | 0.088 | 5.8 | significant | cloudy | easy |
| 14 | 4 | B | 1.6 | 0.071 | 4.7 | significant | cloudy | easy |
| * 15 | 4 | C | 0.7 | 0.058 | 3.6 | none | close to mirror surface | easy |
| 16 | 4 | D | 1.1 | 0.059 | 3.6 | none | close to mirror surface | difficult |

TABLE 3

| Coated cutting insert No. | Coating No. | Treatment Method | Surface Relative Roughness Ra (B/A) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|
| 17 | 5 | A | 1.5 | 0.101 | 5.7 | significant | cloudy | easy |
| 18 | 5 | B | 1.8 | 0.088 | 4.7 | significant | cloudy | easy |
| * 19 | 5 | C | 0.8 | 0.072 | 3.2 | none | close to mirror surface | easy |
| 20 | 5 | D | 1.2 | 0.073 | 3.3 | none | close to mirror surface | difficult |
| 21 | 6 | A | 1.3 | 0.118 | 6.0 | significant | cloudy | easy |
| 22 | 6 | B | 1.5 | 0.114 | 4.9 | significant | cloudy | easy |
| * 23 | 6 | C | 0.7 | 0.106 | 3.0 | none | close to mirror surface | easy |
| 24 | 6 | D | 1.2 | 0.105 | 3.1 | none | close to mirror surface | difficult |
| * 25 | 5 | C | 0.6 | 0.069 | 3.1 | none | close to mirror surface | easy |
| * 26 | 5 | C | 0.4 | 0.064 | 3.0 | none | close to mirror surface | easy |
| * 27 | 5 | C | 0.3 | 0.060 | 2.8 | none | close to mirror surface | easy |

In Tables 2 and 3, the insert marked with "asterisk" represents the example of the present invention. The outermost layer of the base layer each exhibited black color regardless of the type of the coating, TiN and ZrN employed in the indicating layer exhibited gold color, TiCN employed in the indicating layer exhibited pink color, and CrN employed in the indicating layer exhibited silver color.

As can clearly be seen from Tables 2 and 3, in coated cutting inserts Nos. 3, 7, 11, 15, 19, 23, 25, 26, and 27 representing the examples of the present invention, recognition of the used state of the cutting-edge portion was easy, and these inserts were excellent in the attention-drawing function. In addition, in these coated cutting inserts, adhesion of the work material to the cutting edge was not observed, the state of the work material after cutting was close to the mirror surface, and the surface relative roughness was also excellent. When surface relative roughness Ra of the breaker recess portion was set to Aμm and surface relative roughness Ra of the flank face was set to Bμm, relation of B/A≦1 was established in all these coated cutting inserts according to the examples of the present invention.

In contrast, in coated cutting inserts Nos. 1, 2, 5, 6, 9, 10, 13, 14, 17, 18, 21, and 22, though recognition of the used state of the cutting-edge portion was possible, adhesion of a large amount of work material to the cutting edge was observed, the work material after cutting was cloudy, and the surface relative roughness was poor. In addition, in coated cutting inserts Nos. 4, 8, 12, 16, 20, and 24, though the state of the work material after cutting was good, recognition of the used state of the cutting-edge portion of the coated cutting insert was difficult. Namely, these coated cutting inserts did not have the attention-drawing function.

As can be seen from the results above, it is clear that each coated cutting insert representing the example of the present invention achieves an effect superior to that of the coated cutting insert in each comparative example. Therefore, in order to suppress adhesion phenomenon to the work material in the coated cutting insert and to prevent appearance of the work material from being impaired, it is clearly effective to form the indicating layer not on the flank face but on the rake face as well as to set B/A to 1 or smaller when surface relative roughness Ra of the particular area in the rake face (the breaker recess portion or the land portion) is set to Aμm and surface relative roughness Ra of the flank face is set to Bμm, and it is more effective to set the value of B/A further smaller, that is, set the value of B/A to 0.8 or smaller, or 0.7 or smaller.

Example 2

The substrate was obtained in a manner the same as in Example 1, except that the substrate of the coated cutting insert was shaped similarly to cutting insert SEMT13T3AGSN-L (manufactured by Sumitomo Electric Hardmetal Corp.). The substrate had 4 cutting-edge portions, 1 rake face, and 4 flank faces. In addition, the rake face had the chip breaker formed, and adjacent to the cutting-edge portion, had the breaker recess portion inclined from the cutting-edge portion toward the central portion of the rake face to form a concave shape.

Layers listed below were successively formed on the entire surface of the 1e substrate with known thermal CVD. Specifically, the substrate surface was successively coated with TiN having a thickness of 0.5 μm, TiCN (MT-CVD) having a thickness of 3.0 μm, α-alumina ($Al_2O_3$) having a thickness of 1.0 μm, and TiN having a thickness of 0.5 μm serving as the outermost layer (total thickness 5.0 μm). In this coating (referred to as coating No. 7), TiN having a thickness of 0.5 μm (on the substrate surface side), TiCN having a thickness of 3.0 μm, and α-alumina ($Al_2O_3$) having a thickness of 1.0 μm served as the base layer (black), and TiN having a thickness of 0.5 μm as the outermost layer served as the indicating layer (gold).

Similarly, coatings Nos. 8 to 12 in Table 4 below instead of coating No. 7 coated the entire surface of the substrate.

represent comparative examples. Surface relative roughness Ra (value of B/A) was measured as in Example 1.

Then, these coated cutting inserts Nos. 28 to 54 were subjected to milling-cutting test under the conditions below, so as to measure the surface relative roughness of the work material and a flank face wear amount of the coated cutting insert. Tables 5 and 6 show the result. A smaller surface relative roughness of the work material (Rz: defined under JIS B0601 and measured with equipment complying with JIS B0651) indicates more favorable smoothness, and a smaller flank face wear amount indicates better wear resistance.

(Condition for Milling-Cutting Test)

Used cutter: WGC4100R (manufactured by Sumitomo Electric Hardmetal Corp.)

Work material: FC250

TABLE 4

| | | Coating | | |
|---|---|---|---|---|
| No. | Base Layer | | Indicating Layer | Total Thickness |
| 7 | TiN (0.5 μm)/TiCN (MT-CVD, 3.0 μm)/α-$Al_2O_3$ (1.0 μm) | | TiN (0.5 μm) | 5.0 μm |
| 8 | TiN (0.4 μm)/TiCN (MT-CVD, 3.4 μm)/TiBN(0.7 μm)/κ-$Al_2O_3$ (1.1 μm) | | TiN (0.4 μm) | 6.0 μm |
| 9 | TiN (0.3 μm)/TiCN (MT-CVD, 5.1 μm)/$ZrO_2$ (1.1 μm) | | TiN (0.4 μm) | 6.9 μm |
| 10 | TiAlN (2.4 μm)/α-$Al_2O_3$ (1.1 μm) | | TiN (0.4 μm) | 3.9 μm |
| 11 | CrAlN (2.6 μm)/κ-$Al_2O_3$ (1.3 μm) | | Cr (0.5 μm) | 4.4 μm |
| 12 | TiN (0.4 μm)/TiAlN (3.6 μm) | | TiCN (0.5 μm) | 4.5 μm |

Layers of the base layer were stacked on the surface of the substrate, successively from the one in the left shown in Table 4 above. Coatings Nos. 8 and 9 were formed with known thermal CVD, in a manner similar to coating No. 7. Coatings Nos. 10 to 12 were formed with known PVD.

The coated substrates were treated with treatment methods A to D the same as in Example 1, so as to manufacture twenty-seven types of coated cutting inserts Nos. 28 to 54 in Tables 5 and 6 below. Nos. 30, 34, 38, 42, 46, 50, 52, 53, and 54 represent the examples of the present invention, and others Cutting speed: 150 m/min Feed: 0.3 mm/rev.

Depth of cut: 1.0 mm

Cutting oil: not used

Cutting distance: 12 m

As the milling-cutting test was conducted with one coated cutting insert attached to the cutter, feed per one turn of the cutter is equal to the feed per one tooth.

TABLE 5

| | Coated cutting insert No. | Coating No. | Treatment Method | Surface Relative Roughness Ra (B/A) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
| | 28 | 7 | A | 1.3 | 0.090 | 9.7 | significant | cloudy | easy |
| | 29 | 7 | B | 1.7 | 0.077 | 8.8 | significant | cloudy | easy |
| * | 30 | 7 | C | 0.8 | 0.066 | 6.2 | none | close to mirror surface | easy |
| | 31 | 7 | D | 1.2 | 0.066 | 6.2 | none | close to mirror surface | difficult |
| | 32 | 8 | A | 1.4 | 0.097 | 9.5 | significant | cloudy | easy |
| | 33 | 8 | B | 1.9 | 0.085 | 8.9 | significant | cloudy | easy |
| * | 34 | 8 | C | 0.7 | 0.074 | 6.3 | none | close to mirror surface | easy |
| | 35 | 8 | D | 1.3 | 0.074 | 6.3 | none | close to mirror surface | difficult |
| | 36 | 9 | A | 1.3 | 0.088 | 9.7 | significant | cloudy | easy |
| | 37 | 9 | B | 1.9 | 0.075 | 8.8 | significant | cloudy | easy |
| * | 38 | 9 | C | 0.7 | 0.066 | 6.6 | none | close to mirror surface | easy |
| | 39 | 9 | D | 1.2 | 0.067 | 6.5 | none | close to mirror surface | difficult |
| | 40 | 10 | A | 1.4 | 0.117 | 9.3 | significant | cloudy | easy |
| | 41 | 10 | B | 1.8 | 0.105 | 8.2 | significant | cloudy | easy |
| * | 42 | 10 | C | 0.6 | 0.085 | 6.3 | none | close to mirror surface | easy |
| | 43 | 10 | D | 1.3 | 0.086 | 6.4 | none | close to mirror surface | difficult |

TABLE 6

| Coated cutting insert No. | Coating No. | Treatment Method | Surface Relative Roughness Ra (B/A) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|
| 44 | 11 | A | 1.3 | 0.124 | 9.5 | significant | cloudy | easy |
| 45 | 11 | B | 1.7 | 0.116 | 8.3 | significant | cloudy | easy |
| *  46 | 11 | C | 0.7 | 0.101 | 6.1 | none | close to mirror surface | easy |
| 47 | 11 | D | 1.2 | 0.100 | 6.2 | none | close to mirror surface | difficult |
| 48 | 12 | A | 1.3 | 0.135 | 9.4 | significant | cloudy | easy |
| 49 | 12 | B | 1.6 | 0.115 | 8.5 | significant | cloudy | easy |
| *  50 | 12 | C | 0.7 | 0.107 | 5.8 | none | close to mirror surface | easy |
| 51 | 12 | D | 1.1 | 0.107 | 5.8 | none | close to mirror surface | difficult |
| *  52 | 8 | C | 0.6 | 0.070 | 6.2 | none | close to mirror surface | easy |
| *  53 | 8 | C | 0.4 | 0.066 | 6.1 | none | close to mirror surface | easy |
| *  54 | 8 | C | 0.2 | 0.063 | 5.9 | none | close to mirror surface | easy |

In Tables 5 and 6, the insert marked with "asterisk" represents the example of the present invention. The outermost layer of the base layer each exhibited black color regardless of the type of the coating, TiN employed in the indicating layer exhibited gold color, Cr employed in the indicating layer exhibited silver color, and TiCN employed in the indicating layer exhibited pink color.

As can clearly be seen from Tables 5 and 6, in coated cutting inserts Nos. 30, 34, 38, 42, 46, 50, 52, 53, and 54 representing the examples of the present invention, recognition of the used state of the cutting-edge portion was easy, and these inserts were excellent in the attention-drawing function. In addition, in these coated cutting inserts, adhesion of the work material to the cutting edge was not observed, the state of the work material after cutting was close to the mirror surface, and the surface relative roughness was also excellent. When surface relative roughness Ra of the breaker recess portion was set to Aμm and surface relative roughness Ra of the flank face was set to Bμm, relation of B/A≦1 was established in all these coated cutting inserts according to the examples of the present invention.

In contrast, in coated cutting inserts Nos. 28, 29, 32, 33, 36, 37, 40, 41, 44, 45, 48, and 49, though recognition of the used state of the cutting-edge portion was possible, adhesion of a large amount of work material to the cutting edge was observed, the work material after cutting was cloudy, and the surface relative roughness was poor. In addition, in coated cutting inserts Nos. 31, 35, 39, 43, 47, and 51, though the state of the work material after cutting was good, recognition of the used state of the cutting-edge portion of the coated cutting insert was difficult. Namely, the coated cutting inserts did not have the attention-drawing function.

As can be seen from the results above, it is clear that the coated cutting insert representing the example of the present invention achieves an effect superior to that of the coated cutting insert in each comparative example.

Example 3

The substrate employed in Example 1 was subjected to cutting-edge treatment (the cutting-edge portion was subjected to SiC brush honing treatment, and curve (R) of a radius of approximately 0.05 mm was provided to the intersection of the rake face and the flank face).

The coating the same as in Example 1 (coatings Nos. 1 to 6) coated the entire surface of the substrate.

The coated substrates were treated with the following 3 types of treatment methods C1 to C3. It is noted that, in each treatment method, the area where the indicating layer should remain was masked with a jig.

(Treatment Method C1)

The coating was subjected to brushing treatment (using the diamond brush), and thereafter subjected to blasting (alumina sand #120 (average particle size 100 μm) was used and the pressure was set to 0.3 MPa), so as to remove the indicating layer on the flank face and also the indicating layer on the rake face in a region having a width of 0.18 mm from the cutting-edge portion (this width is not necessarily uniform, but it is intended that the maximum width is set to 0.18 mm (the width at a position where an angle of an acute-angle corner portion of the rake face is divided into equal halves (hereinafter, referred to as R/2 site) was set to 0.12 mm; the reason why the width could not be uniform is that, though masking was performed as accurately as possible, it was difficult to maintain the width constant due to reaching of blasting, and it was impossible to eliminate error; to be understood similarly in each treatment method hereinafter)).

Therefore, the rake face except for the region having the width of 0.18 mm from the cutting-edge portion exhibited the color of the indicating layer (for example, in the case of coating No. 1, gold which is the color of TiN), and the flank face and the rake face in the region having the width of 0.18 mm from the cutting-edge portion exhibited the color of the base layer (for example, in the case of coating No. 1, black which is the color of $Al_2O_3$).

(Treatment Method C2)

The coating was subjected to blasting treatment (the condition the same as in treatment method C1 was adopted), so as to remove the indicating layer on the flank face and also the indicating layer on the rake face in the region having a width of 0.09 mm from the cutting-edge portion (width at the R/2 site: 0.06 mm). Therefore, the rake face except for the region having the width of 0.09 mm from the cutting-edge portion exhibited the color of the indicating layer (for example, in the case of coating No. 1, gold which is the color of TiN), and the flank face and the rake face in the region having the width of 0.09 mm from the cutting-edge portion exhibited the color of the base layer (for example, in the case of coating No. 1, black which is the color of $Al_2O_3$).

(Treatment Method C3)

The coating was subjected to blasting treatment (the condition the same as in treatment method C1 was adopted), and thereafter subjected to brushing treatment (the condition the same as in treatment method C1 was adopted), so as to remove the indicating layer on the flank face and also the indicating layer on the rake face in the region having a width of 0.16 mm from the cutting-edge portion (width at the R/2 site: 0.11 mm). Therefore, the rake face except for the region having the width of 0.16 mm from the cutting-edge portion exhibited the color of the indicating layer (for example, in the case of coating No. 1, gold which is the color of TiN), and the flank face and the rake face in the region having the width of 0.16 mm from the cutting-edge portion exhibited the color of the base layer (for example, in the case of coating No. 1, black which is the color of $Al_2O_3$).

Twenty-seven types of coated cutting inserts Nos. 101 to 127 in Table 7 below were thus manufactured. In Table 7, the insert marked with "asterisk" represents the example of the present invention, and coating No. represents coatings Nos. 1 to 6 above. Surface relative roughness Ra (value of B/A) of each coated cutting insert was measured as in Example 1.

Then, these coated cutting inserts Nos. 101 to 127 were subjected to turning-cutting test under the conditions the same as in Example 1, so as to measure the surface relative roughness of the work material and a flank face wear amount of the coated cutting insert. Table 7 below shows the result. As in Example 1, a smaller surface relative roughness (Rz) of the work material indicates more favorable smoothness, and a smaller flank face wear amount indicates better wear resistance.

TABLE 7

| | Coated cutting insert No. | Coating No. | Treatment Method | Surface Relative Roughness Ra (B/A) | Flank Face Wear Amount (mm) | Surface Relative Roughness Rz of Work Material (μm) | State of Adhesion of Work Material to Cutting Edge | State of work Surface of Work Material | Recognition of Used State of Cutting Edge |
|---|---|---|---|---|---|---|---|---|---|
| * | 101 | 1 | C1 | 0.9 | 0.103 | 2.8 | none | close to mirror surface | easy |
| * | 102 | 1 | C2 | 0.8 | 0.104 | 2.9 | none | close to mirror surface | easy |
| * | 103 | 1 | C3 | 0.9 | 0.104 | 2.8 | none | close to mirror surface | easy |
| * | 104 | 2 | C1 | 0.8 | 0.135 | 3.2 | none | close to mirror surface | easy |
| * | 105 | 2 | C2 | 0.7 | 0.135 | 3.1 | none | close to mirror surface | easy |
| * | 106 | 2 | C3 | 0.8 | 0.136 | 3.2 | none | close to mirror surface | easy |
| * | 107 | 3 | C1 | 0.8 | 0.081 | 3.1 | none | close to mirror surface | easy |
| * | 108 | 3 | C2 | 0.6 | 0.080 | 3.2 | none | close to mirror surface | easy |
| * | 109 | 3 | C3 | 0.7 | 0.082 | 3.2 | none | close to mirror surface | easy |
| * | 110 | 4 | C1 | 0.8 | 0.059 | 3.6 | none | close to mirror surface | easy |
| * | 111 | 4 | C2 | 0.7 | 0.058 | 3.6 | none | close to mirror surface | easy |
| * | 112 | 4 | C3 | 0.8 | 0.058 | 3.6 | none | close to mirror surface | easy |
| * | 113 | 5 | C1 | 0.8 | 0.071 | 0.8 | none | close to mirror surface | easy |
| * | 114 | 5 | C2 | 0.8 | 0.072 | 0.8 | none | close to mirror surface | easy |
| * | 115 | 5 | C3 | 0.8 | 0.071 | 0.8 | none | close to mirror surface | easy |
| * | 116 | 6 | C1 | 0.7 | 0.107 | 0.7 | none | close to mirror surface | easy |
| * | 117 | 6 | C2 | 0.7 | 0.106 | 0.6 | none | close to mirror surface | easy |
| * | 118 | 6 | C3 | 0.7 | 0.106 | 0.7 | none | close to mirror surface | easy |
| * | 119 | 5 | C1 | 0.7 | 0.068 | 0.6 | none | close to mirror surface | easy |
| * | 120 | 5 | C2 | 0.6 | 0.068 | 0.6 | none | close to mirror surface | easy |
| * | 121 | 5 | C3 | 0.7 | 0.069 | 0.7 | none | close to mirror surface | easy |
| * | 122 | 5 | C1 | 0.5 | 0.064 | 0.4 | none | close to mirror surface | easy |
| * | 123 | 5 | C2 | 0.5 | 0.063 | 0.5 | none | close to mirror surface | easy |
| * | 124 | 5 | C3 | 0.5 | 0.064 | 0.4 | none | close to mirror surface | easy |
| * | 125 | 5 | C1 | 0.3 | 0.061 | 0.3 | none | close to mirror surface | easy |

TABLE 7-continued

| | Coated cutting insert No. | Coating No. | Treatment Method | Surface Relative Roughness Ra (B/A) | Flank Face Wear Amount (mm) | Surface Relative Roughness Rz of Work Material (μm) | State of Adhesion of Work Material to Cutting Edge | State of work Surface of Work Material | Recognition of Used State of Cutting Edge |
|---|---|---|---|---|---|---|---|---|---|
| * | 126 | 5 | C2 | 0.3 | 0.059 | 0.3 | none | close to mirror surface | easy |
| * | 127 | 5 | C3 | 0.3 | 0.060 | 0.3 | none | close to mirror surface | easy |

As can clearly seen from Table 7, coated cutting inserts Nos. 101 to 127 representing the examples of the present invention show the results substantially the same as those of the coated cutting insert subjected to treatment using treatment method C in Example 1. Specifically, in these coated cutting inserts, recognition of the used state of the cutting-edge portion was easy, and these inserts were excellent in the attention-drawing function. In addition, in these coated cutting inserts, adhesion of the work material to the cutting edge was not observed, the state of the work material after cutting was close to the mirror surface, and the surface relative roughness was also excellent. When surface relative roughness Ra of the breaker recess portion was set to Aμm and surface relative roughness Ra of the flank face was set to Bμm, relation of B/A≦1 was established in all these coated cutting inserts according to the examples of the present invention.

It is noted that coated cutting inserts Nos. 119 to 127 having different surface relative roughness (value of B/A) were obtained by modifying the condition for blasting for each of coated cutting inserts Nos. 114 to 116.

From the results above, as can clearly be seen from comparison of Example 3 with Example 1 (in which treatment method C was performed), it could be confirmed that substantially the same result was shown in the case (Example 1) in which the indicating layer completely covered cutting-edge portion 4 and reached the portion immediately before the flank face as shown in FIG. 9 and in the case (Example 3) in which the indicating layer was not formed in the cutting-edge portion or the like as shown in FIGS. 7, 8 and 10.

Example 4

The substrate employed in Example 2 was subjected to cutting-edge treatment (the cutting-edge portion was subjected to SiC brush honing treatment, and curve (R) of a radius of approximately 0.05 mm was provided to the intersection of the rake face and the flank face).

The coating the same as in Example 2 (coatings Nos. 7 to 12) coated the entire surface of the substrate.

The coated substrates were treated with three types of treatment methods C1 to C3 that are the same as in Example 3, respectively.

Twenty-seven types of coated cutting inserts Nos. 201 to 227 in Table 8 below were thus manufactured. In Table 8, the insert marked with "asterisk" represents the example of the present invention, and coating No. represents coatings Nos. 7 to 12 above. Surface relative roughness Ra (value of B/A) of each coated cutting insert was measured as in Example 1.

Then, these coated cutting inserts Nos. 201 to 227 were subjected to milling-cutting test under the conditions the same as in Example 2, so as to measure the surface relative roughness of the work material and a flank face wear amount of the coated cutting insert. Table 8 below shows the result. A smaller surface relative roughness (Rz) of the work material indicates more favorable smoothness, and a smaller flank face wear amount indicates better wear resistance.

TABLE 8

| | Coated cutting insert No. | Coating No. | Treatment Method | Surface Relative Roughness Ra (B/A) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
| * | 201 | 7 | C1 | 0.8 | 0.065 | 6.1 | none | close to mirror surface | easy |
| * | 202 | 7 | C2 | 0.7 | 0.066 | 6.2 | none | close to mirror surface | easy |
| * | 203 | 7 | C3 | 0.8 | 0.066 | 6.2 | none | close to mirror surface | easy |
| * | 204 | 8 | C1 | 0.7 | 0.074 | 6.3 | none | close to mirror surface | easy |
| * | 205 | 8 | C2 | 0.7 | 0.074 | 6.2 | none | close to mirror surface | easy |
| * | 206 | 8 | C3 | 0.7 | 0.075 | 6.3 | none | close to mirror surface | easy |
| * | 207 | 9 | C1 | 0.7 | 0.066 | 6.5 | none | close to mirror surface | easy |
| * | 208 | 9 | C2 | 0.8 | 0.065 | 6.6 | none | close to mirror surface | easy |
| * | 209 | 9 | C3 | 0.7 | 0.066 | 6.6 | none | close to mirror surface | easy |
| * | 210 | 10 | C1 | 0.6 | 0.086 | 6.3 | none | close to mirror surface | easy |

TABLE 8-continued

| Coated cutting insert No. | Coating No. | Treatment Method | Surface Relative Roughness Ra (B/A) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|
| * 211 | 10 | C2 | 0.7 | 0.085 | 6.2 | none | close to mirror surface | easy |
| * 212 | 10 | C3 | 0.6 | 0.084 | 6.3 | none | close to mirror surface | easy |
| * 213 | 11 | C1 | 0.7 | 0.100 | 6.1 | none | close to mirror surface | easy |
| * 214 | 11 | C2 | 0.7 | 0.101 | 6.2 | none | close to mirror surface | easy |
| * 215 | 11 | C3 | 0.7 | 0.101 | 6.2 | none | close to mirror surface | easy |
| * 216 | 12 | C1 | 0.7 | 0.107 | 5.9 | none | close to mirror surface | easy |
| * 217 | 12 | C2 | 0.6 | 0.107 | 5.8 | none | close to mirror surface | easy |
| * 218 | 12 | C3 | 0.7 | 0.108 | 5.8 | none | close to mirror surface | easy |
| * 219 | 8 | C1 | 0.6 | 0.071 | 6.1 | none | close to mirror surface | easy |
| * 220 | 8 | C2 | 0.6 | 0.070 | 6.2 | none | close to mirror surface | easy |
| * 221 | 8 | C3 | 0.6 | 0.072 | 6.2 | none | close to mirror surface | easy |
| * 222 | 8 | C1 | 0.4 | 0.068 | 6.0 | none | close to mirror surface | easy |
| * 223 | 8 | C2 | 0.4 | 0.066 | 6.1 | none | close to mirror surface | easy |
| * 224 | 8 | C3 | 0.4 | 0.067 | 6.1 | none | close to mirror surface | easy |
| * 225 | 8 | C1 | 0.2 | 0.062 | 5.9 | none | close to mirror surface | easy |
| * 226 | 8 | C2 | 0.2 | 0.063 | 5.8 | none | close to mirror surface | easy |
| * 227 | 8 | C3 | 0.2 | 0.062 | 5.9 | none | close to mirror surface | easy |

As can clearly seen from Table 8, coated cutting inserts Nos. 201 to 227 representing the examples of the present invention showed the results substantially the same as those of the coated cutting insert subjected to treatment using treatment method C in Example 2. Specifically, in these coated cutting inserts, recognition of the used state of the cutting-edge portion was easy, and these inserts were excellent in the attention-drawing function. In addition, in these coated cutting inserts, adhesion of the work material to the cutting edge was not observed, the state of the work material after cutting was close to the mirror surface, and the surface relative roughness was also excellent. When surface relative roughness Ra of the breaker recess portion was set to Aμm and surface relative roughness Ra of the flank face was set to Bμm, relation of B/A≦1 was established in all these coated cutting inserts according to the examples of the present invention.

It is noted that coated cutting inserts Nos. 219 to 227 having different surface relative roughness (value of B/A) were obtained by modifying the condition for blasting for each of coated cutting inserts Nos. 204 to 206.

From the results above, as can clearly be seen from comparison of Example 4 with Example 2 (in which treatment method C was performed), it could be confirmed that substantially the same result was shown in the case (Example 2) in which the indicating layer completely covered cutting-edge portion 4 and reached the portion immediately before the flank face as shown in FIG. 9 and in the case (Example 4) in which the indicating layer was not formed in the cutting-edge portion or the like as shown in FIGS. 7, 8 and 10.

Example 5

Raw material powders having a composition of 1.8 mass % TiC, 1.2 mass % TaC, 7.0 mass % Co, and WC for the rest were pressed, and successively sintered for one hour at a temperature of 1400° C. in a vacuum atmosphere. Thereafter, the resultant sintered object was subjected to planar polishing treatment and cutting-edge treatment (the cutting-edge portion was subjected to SiC brush honing treatment, and curve (R) of a radius of approximately 0.05 mm was provided to the intersection of the rake face and the flank face), thus fabricating an insert made of cemented carbide in a shape the same as that of cutting insert CNMG120408N-UX (manufactured by Sumitomo Electric Hardmetal Corp.). This insert was employed as the substrate. This substrate had the beta (β) removal layer formed on the surface to a thickness of 13 cm, and had 8 cutting-edge portions, 2 rake faces, and 4 flank faces. In addition, the rake face had the chip breaker formed, and adjacent to the cutting-edge portion, had the breaker recess portion inclined from the cutting-edge portion toward the central portion of the rake face to form a concave shape.

Layers listed below were successively formed on the entire surface of the substrate with known thermal CVD. Specifically, the substrate surface was coated successively with TiN having a thickness of 0.3 μm, TiCN (MT-CVD) having a thickness of 3.8 cm, α-alumina ($Al_2O_3$) having a thickness of 2.3 μm, and TiN having a thickness of 0.3 μm serving as the outermost layer. In this coating (referred to as coating No. 13), TiN having a thickness of 0.3 μm (on the substrate surface side), TiCN having a thickness of 3.81 μm, and α-alumina ($Al_2O_3$) having a thickness of 2.3 μm served as the base layer, and TiN having a thickness of 0.3 μm as the outermost layer served as the indicating layer.

Similarly, coatings Nos. 14 to 17 in Table 9 below instead of coating No. 13 coated the entire surface of the substrate.

ent residual stress was given as shown in Tables 10 and 11 below, by modifying the treatment condition for blasting.

TABLE 9

| | Coating | |
|---|---|---|
| No. | Base Layer | Indicating Layer |
| 13 | TiN (0.3 μm)/TiCN (MT-CVD, 3.8 μm/α-Al$_2$O$_3$ (2.3 μm) | TiN (0.3 μm) |
| 14 | TiC (0.3 μm)/TiCN (MT-CVD, 2.7 μm)/TiN (0.4 μm)/κ-Al$_2$O$_3$ (2.1 μm) | TiCN (0.4 μm) |
| 15 | TiN (0.4 μm)/TiCN (MT-CVD, 4.4 μm)/TiC (1.7 μm)/κ-Al$_2$O$_3$ (1.9 μm) | TiN (0.4 μm) |
| 16 | TiN (0.4 μm)/TiCN (MT-CVD, 5.9 μm)/TiCN (HT-CVD, 0.9 μm)/ TiBN (0.3 μm)/α-Al$_2$O$_3$ (3.2 μm) | TiN (0.3 μm) |
| 17 | TiN (0.4 μm)/TiCN (MT-CVD, 4.6 μm)/TiCNO (0.3 μm)/α-Al$_2$O$_3$ (2.0 μm) | TiN (0.5 μm) |

Note)
In the base layer of No. 17, α-Al$_2$O$_3$ contained 0.170 mass % Zr element (according to the result of analysis using EPMA (Electron Probe MicroAnalysis).

Layers of the base layer were stacked on the surface of the substrate, successively from the one in the left shown in Table 9 above. All layers were formed with known thermal CVD.

Known blasting or combination of known blasting and known brushing was used to perform the following 13 types of treatment methods A1 to F3 on the coated substrates. It is noted that, in each treatment method, the area where the indicating layer should remain was masked with a jig.

(Treatment Method A1)

The coating was not subjected to the treatment with blasting or brushing. Therefore, the surface of the substrate exhibited, on the entire surface, the color of the indicating layer (for example, in the case of coating No. 13, gold which is the color of TiN).

(Treatment Method B1)

The coating was subjected to blasting, so as to remove the indicating layer on the rake face. Therefore, the flank face exhibited the color of the indicating layer (for example, in the case of coating No. 13, gold which is the color of TiN), and the rake face exhibited the color of the base layer (for example, in the case of coating No. 13, black which is the color of Al$_2$O$_3$).

(Treatment Method D1)

The coating was subjected to blasting, so as to remove the indicating layer on the entire surface of the substrate. Therefore, the entire surface of the substrate (both of the rake face and the flank face) exhibited the color of the base layer (for example, in the case of coating No. 13, black which is the color of Al$_2$O$_3$).

(Treatment Method E1)

The coating was subjected to blasting, so as to remove the indicating layer on the flank face and also the indicating layer on the rake face in the region having a width of 0.08 mm from the cutting-edge portion (this width is to be understood as in Example 3, and to be understood similarly in the treatment method below; the width at the R/2 site was set to 0.04 mm). Therefore, the rake face except for the region having the width of 0.08 mm from the cutting-edge portion exhibited the color of the indicating layer (for example, in the case of coating No. 13, gold which is the color of TiN), and the flank face and the rake face in the region having the width of 0.08 mm from the cutting-edge portion exhibited the color of the base layer (for example, in the case of coating No. 13, black which is the color of Al$_2$O$_3$).

(Treatment Methods E2 to E5)

Treatment similar to that in treatment method E1 was performed, except that the width of the region in the rake face from the cutting-edge portion was set to 0.10 mm (width at the R/2 site: 0.07 mm) in treatment method E1 above. Treatment methods E2 to E5 are different from each other in that differ- (Treatment Method E6)

Treatment similar to that in treatment method E1 was performed, except that the width of the region in the rake face from the cutting-edge portion was set to 0.05 mm (width at the R/2 site: 0.02 mm) in treatment method E1 above.

(Treatment Method E7)

Treatment similar to that in treatment method E1 was performed, except that the indicating layer solely on the flank face was removed using blasting such that the indicating layer is formed to completely cover the cutting-edge portion and reach the portion immediately before the flank face in treatment method E1 above.

(Treatment Methods F1 to F3)

The coating was subjected to blasting treatment, and thereafter subjected to brushing treatment, so as to remove the indicating layer on the flank face and also the indicating layer on the rake face in the region having a width of 0.16 mm from the cutting-edge portion (width at the R/2 site: 0.12 mm). Therefore, the rake face except for the region having the width of 0.16 mm from the cutting-edge portion exhibited the color of the indicating layer (for example, in the case of coating No. 13, gold which is the color of TiN), and the flank face and the rake face in the region having the width of 0.16 mm from the cutting-edge portion exhibited the color of the base layer (for example, in the case of coating No. 13, black which is the color of Al$_2$O$_3$). Treatment methods F1 to F3 are different from each other in that different residual stress was given as shown in Tables 10 and 11 below, by modifying the treatment condition for blasting.

Figure 13:
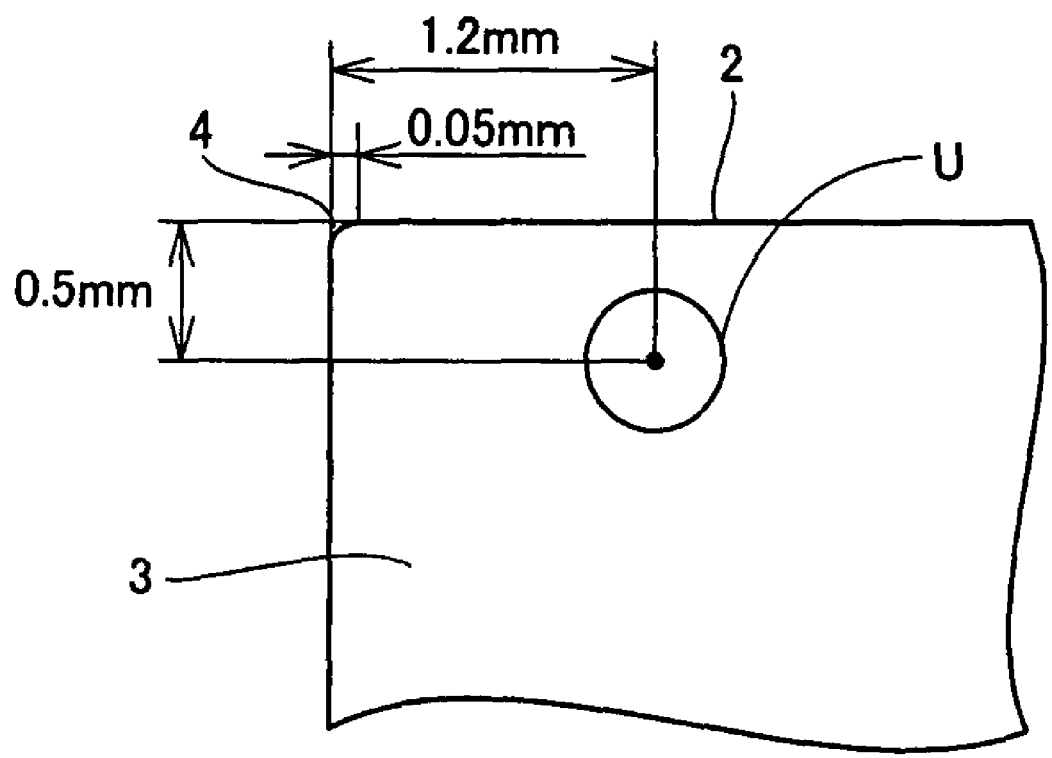
FIG. 13 is a schematic side view showing an area in the vicinity of the cutting-edge corner on a side of a flank face of the coated cutting insert.

Forty-four types of coated cutting inserts Nos. 301 to 344 in Tables 10 and 11 below were thus manufactured. In Tables 10 and 11, the insert marked with "asterisk" represents the example of the present invention, and coating No. represents coatings Nos. 13 to 17 above. In each coated cutting insert representing the example above, the region subjected to blasting or combination of blasting and brushing (this region is included in the area involved with cutting) can have compressive residual stress (in which case, a region other than this region has tensile residual stress). Tables 10 and 11 show numeric values obtained by measurement for an alumina layer in the region shown as spot U (spot size: diameter 0.5 mm) in the flank face in FIG. 13 (this region becomes a part of the area involved with cutting) (the sinew method using the X-ray stress measurement apparatus was adopted as the specific measurement method).

The outermost layer of the base layer each exhibited black color regardless of the type of the coating, TiN employed in the indicating layer exhibited gold color, and TiCN employed in the indicating layer exhibited pink color. In coated cutting insert No. 325, it was observed that α-Al₂O₃ serving as the uppermost layer of the base layer was partially removed in the cutting-edge portion at the R/2 site, and the underlying TiCN (MT-CVD) layer was exposed at the surface. In coated cutting insert No.338, it was observed that the α-Al₂O₃ layer serving as the uppermost layer of the base layer and the underlying TiBN layer were partially removed in the cutting-edge portion at the R/2 site, and the underlying TiCN (HT-CVD) layer was exposed at the surface. These coated cutting inserts Nos. 325 and 338 exhibited the highest cutting edge strength in the cutting test below.

Then, these coated cutting inserts Nos. 301 to 344 were subjected to turning-cutting test under the conditions below, so as to measure the flank face wear amount and a breakage ratio of the coated cutting insert and to check how readily the used state of the cutting-edge portion is recognized (readiness in recognizing the used state of the cutting edge). Tables 10 and 11 below show the result. A smaller flank face wear amount indicates better wear resistance, and a smaller breakage ratio indicates better toughness.

(Condition for Continuous Turning-Cutting Test)
Work material: SCM435 round rod
Cutting speed: 230 m/min
Feed: 0.20 mm/rev.
Depth of cut: 2.0 mm
Cutting oil: water-soluble oil
Cutting time period: 15 minutes A state of adhesion of the work material to the cutting edge and a state of a work surface of the work material one minute after the start of cutting were observed, and the flank face wear amount was measured.

(Condition for Interrupted Turning-Cutting Test)
Work material: SCM440 (round rod with 4 grooves)
Cutting speed: 120 m/min
Feed: 0.40 mm/rev.
Depth of cut: 2.0 mm
Cutting oil: not used
Cutting time period: 1 minute The breakage ratio was calculated based on the count of chipping when 20 cutting edges were used to perform cutting for 1 minute. Namely, assuming the count of chipped cutting edges as n, the breakage ratio (%) is calculated as n/20.

TABLE 10

|   | Coated cutting insert No. | Coating No. | Treatment Method | Residual Stress (GPa) | Flank Face Wear Amount (mm) | Breakage Ratio (%) | State of Adhesion of Work Material to Cutting Edge | State of Work Surface of Work Material | Recognition of Used State of Cutting Edge |
|---|---|---|---|---|---|---|---|---|---|
|   | 301 | 13 | A1 | 0.2 | 0.253 | 100 | Note 1 | cloudy | easy |
|   | 302 | 13 | B1 | 0.2 | 0.252 | 100 | Note 1 | cloudy | easy |
|   | 303 | 13 | D1 | 0.0 | 0.224 | 85 | none | glossy | difficult |
| * | 304 | 13 | E1 | −0.4 | 0.220 | 60 | none | glossy | easy |
| * | 305 | 13 | E2 | −1.1 | 0.221 | 45 | none | glossy | easy |
| * | 306 | 13 | F1 | −0.6 | 0.209 | 55 | none | glossy | easy |
|   | 307 | 14 | A1 | 0.2 | 0.266 | 100 | Note 1 | cloudy | easy |
|   | 308 | 14 | B1 | 0.2 | 0.266 | 100 | Note 1 | cloudy | easy |
|   | 309 | 14 | D1 | 0.0 | 0.230 | 85 | none | glossy | difficult |
| * | 310 | 14 | E1 | −0.5 | 0.228 | 60 | none | glossy | easy |
| * | 311 | 14 | E2 | −1.1 | 0.227 | 50 | none | glossy | easy |
| * | 312 | 14 | F1 | −0.7 | 0.218 | 55 | none | glossy | easy |
|   | 313 | 15 | A1 | 0.2 | 0.241 | 100 | Note 1 | cloudy | easy |
|   | 314 | 15 | B1 | 0.2 | 0.240 | 100 | Note 1 | cloudy | easy |
|   | 315 | 15 | D1 | −0.06 | 0.218 | 85 | none | glossy | difficult |
| * | 316 | 15 | E1 | −0.3 | 0.217 | 55 | none | glossy | easy |
| * | 317 | 15 | E2 | −1.1 | 0.216 | 40 | none | glossy | easy |
| * | 318 | 15 | E3 | −2.5 | 0.212 | 30 | none | glossy | easy |
| * | 319 | 15 | E4 | −3.6 | 0.210 | 15 | none | glossy | easy |
| * | 320 | 15 | E5 | 0.1 | 0.217 | 85 | none | glossy | easy |
| * | 321 | 15 | E6 | −0.5 | 0.216 | 50 | none | glossy | easy |
| * | 322 | 15 | E7 | −0.5 | 0.216 | 50 | none | glossy | easy |

Note 1) slight adhesion to the flank face

TABLE 11

|   | Coated cutting insert No. | Coating No. | Treatment Method | Residual Stress (GPa) | Flank Face Wear Amount (mm) | Breakage Ratio (%) | State of Adhesion of Work Material to Cutting Edge | State of Work Surface of Work Material | Recognition of Used State of Cutting Edge |
|---|---|---|---|---|---|---|---|---|---|
| * | 323 | 15 | F1 | −0.8 | 0.215 | 45 | none | glossy | easy |
| * | 324 | 15 | F2 | −2.0 | 0.210 | 35 | none | glossy | easy |
| * | 325 | 15 | F3 | −2.0 | 0.190 | 25 | none | glossy | easy |
|   | 326 | 16 | A1 | 0.3 | 0.185 | 100 | Note 1 | cloudy | easy |
|   | 327 | 16 | B1 | 0.2 | 0.184 | 100 | Note 1 | cloudy | easy |
|   | 328 | 16 | D1 | −0.05 | 0.165 | 75 | none | glossy | difficult |
| * | 329 | 16 | E1 | −0.4 | 0.164 | 60 | none | glossy | easy |
| * | 330 | 16 | E2 | −1.2 | 0.164 | 45 | none | glossy | easy |
| * | 331 | 16 | E3 | −2.4 | 0.165 | 30 | none | glossy | easy |
| * | 332 | 16 | E4 | −3.5 | 0.161 | 20 | none | glossy | easy |
| * | 333 | 16 | E5 | 0.1 | 0.168 | 75 | none | glossy | easy |
| * | 334 | 16 | E6 | −0.4 | 0.168 | 50 | none | glossy | easy |
| * | 335 | 16 | E7 | −0.4 | 0.167 | 55 | none | glossy | easy |

TABLE 11-continued

| Coated cutting insert No. | Coating No. | Treatment Method | Residual Stress (GPa) | Flank Face Wear Amount (mm) | Breakage Ratio (%) | State of Adhesion of Work Material to Cutting Edge | State of Work Surface of Work Material | Recognition of Used State of Cutting Edge |
|---|---|---|---|---|---|---|---|---|
| * 336 | 16 | F1 | −0.7 | 0.165 | 45 | none | glossy | easy |
| * 337 | 16 | F2 | −1.9 | 0.161 | 40 | none | glossy | easy |
| * 338 | 16 | F3 | −1.9 | 0.154 | 25 | none | glossy | easy |
| 339 | 17 | A1 | 0.2 | 0.198 | 100 | Note 1 | cloudy | easy |
| 340 | 17 | B1 | 0.2 | 0.199 | 100 | Note 1 | cloudy | easy |
| 341 | 17 | D1 | 0.0 | 0.165 | 80 | none | glossy | difficult |
| * 342 | 17 | E1 | −0.4 | 0.164 | 55 | none | glossy | easy |
| * 343 | 17 | E2 | −1.0 | 0.164 | 45 | none | glossy | easy |
| * 344 | 17 | F1 | −0.8 | 0.162 | 50 | none | glossy | easy |

Note 1) slight adhesion to the flank face

As can clearly be seen from Tables 10 and 11, in coated cutting inserts representing the examples of the present invention, recognition of the used state of the cutting-edge portion was easy, and these inserts were excellent in the attention-drawing function. In addition, in these coated cutting inserts, adhesion of the work material to the cutting edge was not observed, the state of the work material after cutting was close to the mirror surface, and the flank face wear amount and the breakage ratio were also excellent.

In contrast, in coated cutting inserts that were subjected to treatment with treatment methods A1 and B1 among the coated cutting inserts in comparative examples (the insert not marked with "asterisk"), though recognition of the used state of the cutting-edge portion was possible, slight adhesion of the work material to the flank face of the cutting edge was observed, the work material after cutting was cloudy, and the flank face wear amount and the breakage ratio were also poor. Meanwhile, in the coated cutting inserts subjected to treatment with treatment method D1 among the coated cutting inserts in comparative examples, though the state of the work material after cutting or the like was good, recognition of the used state of the cutting-edge portion was difficult. Namely, the coated cutting inserts did not have the attention-drawing function.

As can be seen from the results above, it is clear that each coated cutting insert representing the example of the present invention achieved an effect superior to that of the coated cutting insert in each comparative example. Therefore, in order to suppress adhesion phenomenon that occurs between the work material and the coated cutting insert and to prevent appearance of the work material from being impaired, it is effective to form the indicating layer not on the flank face but on the rake face, and it is effective that at least one layer (for example, the alumina layer in the above) implementing the base layer has compressive residual stress in the portion where the indicating layer is not formed, in at least a part of the area involved with cutting.

Example 6

Four types of coated cutting inserts Nos. 339-2 to 339-5 different from each other were obtained by performing the following 4 types of treatment methods E8, E9, F4, and F5 in coated cutting insert No. 339 in Example 5, instead of treatment method A1.

(Treatment Method E8)

The coating was subjected to blasting, so as to remove the indicating layer on the flank face and also the indicating layer on the rake face in the region having a width of 0.07 mm from the cutting-edge portion (this width is to be understood as in Example 3, and to be understood similarly in the treatment method below; the width at the R/2 site was set to 0.03 mm).

(Treatment Method E9)

Treatment similar to that in treatment method E8 was performed, except that the width of the region in the rake face from the cutting-edge portion was set to 0.15 mm (width at the R/2 site: 0.09 mm) in treatment method E8 above.

(Treatment Method F4)

The coating was subjected to blasting treatment, and thereafter subjected to brushing treatment, so as to remove the indicating layer on the flank face and also the indicating layer on the rake face in the region having a width of 0.14 mm from the cutting-edge portion (width at the R/2 site: 0.11 mm).

(Treatment Method F5)

Treatment similar to that in treatment method F4 was performed, except that the width of the region in the rake face from the cutting-edge portion was set to 0.19 mm (width at the R/2 site: 0.13 mm) in treatment method F4 above.

Residual stress, the state of adhesion of the work material to the cutting edge, the state of the work surface of the work material, the flank face wear amount, the breakage ratio, and readiness in recognizing the used state of the cutting edge of these coated cutting inserts were measured or observed, as in Example 5. In addition, surface relative roughness Ra (value of B/A) was measured as in Example 1. Table 12 below shows the result.

TABLE 12

| Coated cutting insert No. | Coating No. | Treatment Method | Surface Relative Roughness Ra (B/A) | Residual Stress (Gpa) | Flank Face Wear Amount (mm) | Breakage Ratio (%) | State of Adhesion of Work Material to Cutting Edge | Surface of Work Surface of Work Material | Recognition of Used State of Cutting Edge |
|---|---|---|---|---|---|---|---|---|---|
| 339 | 17 | A1 | 1.3 | 0.2 | 0.198 | 100 | Note 1 | cloudy | easy |
| * 339-2 | 17 | E8 | 0.9 | −0.4 | 0.156 | 55 | none | glossy | easy |
| * 339-3 | 17 | E9 | 0.7 | −0.4 | 0.139 | 50 | none | glossy | easy |

TABLE 12-continued

| Coated cutting insert No. | Coating No. | Treatment Method | Surface Relative Roughness Ra (B/A) | Residual Stress (Gpa) | Flank Face Wear Amount (mm) | Breakage Ratio (%) | State of Adhesion of Work Material to Cutting Edge | Surface of Work Surface of Work Material | Recognition of Used State of Cutting Edge |
|---|---|---|---|---|---|---|---|---|---|
| * 339-4 | 17 | F4 | 0.8 | −0.4 | 0.153 | 55 | none | glossy | easy |
| * 339-5 | 17 | F5 | 0.6 | −0.4 | 0.137 | 20 | none | glossy | easy |

Note 1) slight adhesion to the flank face

In Table 12, the insert marked with "asterisk" represents the example of the present invention. In coated cutting insert No. 339-5, it was observed that the α-Al$_2$O$_3$ layer serving as the uppermost layer of the base layer and the underlying TiCNO layer were partially removed in the cutting-edge portion at the R/2 site, and the underlying TiCN (MT-CVD) layer was exposed at the surface. This coated cutting insert No. 339-5 exhibited the highest cutting-edge strength in the cutting test.

As can be seen from Table 12, it is clear that each coated cutting insert representing the example of the present invention (Nos. 339-2 to 339-5) achieved an effect superior to that of the coated cutting insert in comparative example (No. 339). Therefore, in order to suppress adhesion phenomenon that occurs between the work material and the coated cutting insert and to prevent appearance of the work material from being impaired, it is effective to form the indicating layer not on the flank face but on the rake face, and to set B/A to 1 or smaller when surface relative roughness Ra of the particular area of the rake face (the breaker recess portion or the land portion) is set to Aμm and surface relative roughness Ra of the flank face is set to Bμm. In addition, it is effective that at least one layer (for example, the alumina layer in the above) implementing the base layer has compressive residual stress in the portion where the indicating layer is not formed, in at least a part of the area involved with cutting (that is, the region subjected to blasting or combination of blasting and brushing in the above).

Example 7

Raw material powders having a composition of 0.4 mass % TaC, 0.25 mass % Cr$_3$C$_2$, 9.0 mass % Co, and WC for the rest were pressed, and successively sintered for one hour at a temperature of 1400° C in a vacuum atmosphere. Thereafter, the resultant sintered object was subjected to planar polishing treatment and cutting-edge treatment (the cutting-edge portion was subjected to SiC brush honing treatment, and curve (R) of a radius of approximately 0.05 mm was provided to the intersection of the rake face and the flank face), thus fabricating an insert made of cemented carbide in a shape the same as that of cutting insert SEMT13T3AGSN-G (manufactured by Sumitomo Electric Hardmetal Corp.). This insert was employed as the substrate. The substrate did not have the beta (β) removal layer formed on the surface, and had 4 cutting-edge portions, 1 rake face, and 4 flank faces. In addition, the rake face had the chip breaker formed, and adjacent to the cutting-edge portion, had the breaker recess portion inclined from the cutting-edge portion toward the central portion of the rake face to form a concave shape.

Layers listed below were successively formed on the entire surface of the substrate with known thermal CVD. Specifically, the substrate surface was coated successively with TiN having a thickness of 0.3 μm, TiCN (MT-CVD) having a thickness of 3.1 μm, α-alumina (Al$_2$O$_3$) having a thickness of 2.1 μm, and TiN having a thickness of 0.3 μm serving as the outermost layer. In this coating (referred to as coating No. 18), TiN having a thickness of 0.3 μm (on the substrate surface side), TiCN having a thickness of 3.1 μm, and a-alumina (Al$_2$O$_3$) having a thickness of 2.1 μm served as the base layer, and TiN having a thickness of 0.3 μm as the outermost layer served as the indicating layer.

Similarly, coatings Nos. 19 to 22 in Table 13 below instead of coating No. 18 coated the entire surface of the substrate.

TABLE 13

| | | Coating | |
|---|---|---|---|
| No. | Base Layer | | Indicating Layer |
| 18 | TiN (0.3 μm)/TiCN (MT-CVD, 3.1 μm)/α-Al$_2$O$_3$ (2.1 μm) | | TiN (0.3 μm) |
| 19 | TiC (0.3 μm)/TiCN (MT-CVD, 2.2 μm)/TiN (0.4 μm)/κ-Al$_2$O$_3$ (1.5 μm) | | TiCN (0.3 μm) |
| 20 | TiN (0.3 μm)/TiCN (MT-CVD, 2.3 μm)/TiC (0.9 μm)/α-Al$_2$O$_3$ (2.1 μm) | | TiN (0.4 μm) |
| 21 | TiN (0.4 μm)/TiCN (MT-CVD, 2.2 μm)/TiCN (HT-CVD, 0.9 μm)/ TiBN (0.4 μm)/κ-Al$_2$O$_3$ (2.1 μm) | | TiN (0.3 μm) |
| 22 | TiN (0.5 μm)/TiCN (MT-CVD, 2.4 μm)/TiCNO (0.3 μm)/α-Al$_2$O$_3$ (2.2 μm) | | TiN (0.5 μm) |

Layers of the base layer were stacked on the surface of the substrate successively from the one in the left shown in Table 13 above. All layers were formed with known thermal CVD.

Known blasting or combination of known blasting and known brushing was used to perform the following 13 types of treatment methods A2 to H3 on the coated substrates. It is noted that, in each treatment method, the area where the indicating layer should remain was masked with a jig.

(Treatment Method A2)

The coating was not subjected to the treatment with blasting or brushing. Therefore, the surface of the substrate exhibited, on the entire surface, the color of the indicating layer (for example, in the case of coating No. 18, gold which is the color of TiN).

(Treatment Method B2)

The coating was subjected to blasting, so as to remove the indicating layer on the rake face. Therefore, the flank face exhibited the color of the indicating layer (for example, in the case of coating No. 18, gold which is the color of TiN), and the rake face exhibited the color of the base layer (for example, in the case of coating No. 18, black which is the color of Al$_2$O$_3$).

(Treatment Method D2)

The coating was subjected to blasting, so as to remove the indicating layer on the entire surface of the substrate. Therefore, the entire surface of the substrate (both of the rake face and the flank face) exhibited the color of the base layer (for example, in the case of coating No. 18, black which is the color of $Al_2O_3$).

(Treatment Method G1)

The coating was subjected to blasting, so as to remove the indicating layer on the flank face and also the indicating layer on the rake face in the region having a width of 0.07 mm from the cutting-edge portion (this width is to be understood as in Example 3, and to be understood similarly in the treatment method below; the width at the R/2 site was set to 0.05 mm). Therefore, the rake face except for the region having the width of 0.07 mm from the cutting-edge portion exhibited the color of the indicating layer (for example, in the case of coating No. 18, gold which is the color of TiN), and the flank face and the rake face in the region having the width of 0.07 mm from the cutting-edge portion exhibited the color of the base layer (for example, in the case of coating No. 18, black which is the color of $Al_2O_3$).

(Treatment Methods G2 to G5)

Treatment similar to that in treatment method G1 was performed, except that the width of the region in the rake face from the cutting-edge portion was set to 0.12 mm (width at the R/2 site: 0.11 μmm) in treatment method GI above. Treatment methods G2 to G5 are different from each other in that different residual stress was given as shown in Tables 14 and 15 below, by modifying the treatment condition for blasting.

(Treatment Method G6)

Treatment similar to that in treatment method G1 was performed, except that the width of the region in the rake face from the cutting-edge portion was set to 0.06 mm (width at the R/2 site: 0.03 mm) in treatment method G1 above.

(Treatment Method G7)

Treatment similar to that in treatment method G1 was performed, except that the indicating layer solely on the flank face was removed using blasting such that the indicating layer is formed to completely cover the cutting-edge portion and reach the portion immediately before the flank face in treatment method G1 above.

(Treatment Methods H1 to H3)

The coating was subjected to blasting treatment, and thereafter subjected to brushing treatment, so as to remove the indicating layer on the flank face and also the indicating layer on the rake face in the region having a width of 0.15 mm from the cutting-edge portion (width at the R/2 site: 0.13 mm). Therefore, the rake face except for the region having the width of 0.15 mm from the cutting-edge portion exhibited the color of the indicating layer (for example, in the case of coating No. 18, gold which is the color of TiN), and the flank face and the rake face in the region having the width of 0.15 mm from the cutting-edge portion exhibited the color of the base layer (for example, in the case of coating No. 18, black which is the color of $Al_2O_3$). Treatment methods H1 to H3 are different from each other in that different residual stress was given as shown in Tables 14 and 15 below, by modifying the treatment condition for blasting.

Forty-four types of coated cutting inserts Nos. 401 to 444 in Tables 14 and 15 below were thus manufactured. In Tables 14 and 15, the insert marked with "asterisk" represents the example of the present invention, and coating No. represents coatings Nos. 18 to 22 above. In each coated cutting insert representing the example above, the region subjected to blasting or combination of blasting and brushing (this region is included in the area involved with cutting) can have compressive residual stress (in which case, a region other than this region has tensile residual stress). Tables 14 and 15 show numeric values obtained by measurement for an alumina layer in the region shown as spot U (spot size: diameter 0.5 mm) in the flank face in FIG. 13 (this region becomes a part of the area involved with cutting) (the sinew method using the X-ray stress measurement apparatus was adopted as the specific measurement method).

The outermost layer of the base layer each exhibited black color regardless of the type of the coating, TiN employed in the indicating layer exhibited gold color, and TiCN employed in the indicating layer exhibited pink color. In coated cutting insert No. 425, it was observed that $\alpha\text{-}Al_2O_3$ serving as the uppermost layer of the base layer was partially removed in the cutting-edge portion at the R/2 site, and the underlying TiCN (MT-CVD) layer was exposed at the surface. In coated cutting insert No. 438, it was observed that the $\kappa\text{-}Al_2O_3$ layer serving as the uppermost layer of the base layer and the underlying TiBN layer were partially removed in the cutting-edge portion at the R/2 site, and the underlying TiCN (HT-CVD) layer was exposed at the surface. These coated cutting inserts Nos. 425 and 438 exhibited the highest cutting-edge strength in the cutting test below.

Then, these coated cutting inserts Nos. 401 to 444 were subjected to milling-cutting test under the conditions below (the test was conducted with one coated cutting insert attached to the cutter (WGC4100R) manufactured by Sumitomo Electric Hardmetal Corp.), so as to measure the flank face wear amount and a breakage ratio of the coated cutting insert and to check how readily the used state of the cutting-edge portion is recognized (readiness in recognizing the used state of the cutting edge). Tables 14 and 15 below show the result. A smaller flank face wear amount indicates better wear resistance, and a smaller breakage ratio indicates better toughness.

(Condition for Milling-Wear-Resistance Test)

Work material: SCM440 block material

Cutting speed: 240 m/min

Feed: 0.22 mm/rev.

Depth of cut: 2.0 mm

Cutting oil: water-soluble oil

Cutting distance: 5 m

A state of adhesion of the work material to the cutting edge and a state of the work surface of the work material one minute after the start of cutting were observed, and the flank face wear amount was measured.

(Condition for Milling-Toughness Test)

Work material: S50C block material (with slit)

Cutting speed: 130 m/min

Feed: 0.42 mm/rev.

Depth of cut: 2.0 mm

Cutting oil: not used

Cutting distance: 1 m

The breakage ratio was calculated based on the count of chipping when 20 cutting edges were used to perform cutting for 1 minute. Namely, assuming the count of chipped cutting edges as n, the breakage ratio (%) was calculated as n/20.

TABLE 14

| | Coated cutting insert No. | Coating No. | Treatment Method | Residual Stress (GPa) | Flank Face Wear Amount (mm) | Breakage Ratio (%) | State of Adhesion of Work Material to Cutting Edge | State of Work Surface of Work Material | Recognition of Used State of Cutting Edge |
|---|---|---|---|---|---|---|---|---|---|
| | 401 | 18 | A2 | 0.2 | 0.242 | 100 | Note 1 | cloudy | easy |
| | 402 | 18 | B2 | 0.2 | 0.240 | 100 | Note 1 | cloudy | easy |
| | 403 | 18 | D2 | 0.0 | 0.208 | 80 | none | glossy | difficult |
| * | 404 | 18 | G1 | −0.5 | 0.203 | 60 | none | glossy | easy |
| * | 405 | 18 | G2 | −1.2 | 0.202 | 50 | none | glossy | easy |
| * | 406 | 18 | H1 | −0.7 | 0.194 | 55 | none | glossy | easy |
| | 407 | 19 | A2 | 0.2 | 0.255 | 100 | Note 1 | cloudy | easy |
| | 408 | 19 | B2 | 0.2 | 0.254 | 100 | Note 1 | cloudy | easy |
| | 409 | 19 | D2 | 0.0 | 0.221 | 90 | none | glossy | difficult |
| * | 410 | 19 | G1 | −0.4 | 0.213 | 65 | none | glossy | easy |
| * | 411 | 19 | G2 | −1.2 | 0.211 | 50 | none | glossy | easy |
| * | 412 | 19 | H1 | −0.8 | 0.212 | 60 | none | glossy | easy |
| | 413 | 20 | A2 | 0.2 | 0.220 | 100 | Note 1 | cloudy | easy |
| | 414 | 20 | B2 | 0.2 | 0.219 | 100 | Note 1 | cloudy | easy |
| | 415 | 20 | D2 | −0.05 | 0.207 | 90 | none | glossy | difficult |
| * | 416 | 20 | G1 | −0.4 | 0.198 | 50 | none | glossy | easy |
| * | 417 | 20 | G2 | −1.1 | 0.197 | 40 | none | glossy | easy |
| * | 418 | 20 | G3 | −2.4 | 0.194 | 25 | none | glossy | easy |
| * | 419 | 20 | G4 | −3.5 | 0.198 | 15 | none | glossy | easy |
| * | 420 | 20 | G5 | 0.2 | 0.197 | 90 | none | glossy | easy |
| * | 421 | 20 | G6 | −0.4 | 0.196 | 50 | none | glossy | easy |
| * | 422 | 20 | G7 | −0.6 | 0.197 | 50 | none | glossy | easy |

Note 1) slight adhesion to the flank face

TABLE 15

| | Coated cutting insert No. | Coating No. | Treatment Method | Residual Stress (GPa) | Flank Face Wear Amount (mm) | Breakage Ratio (%) | State of Adhesion of Work Material to Cutting Edge | State of Work Surface of Work Material | Recognition of Used State of Cutting Edge |
|---|---|---|---|---|---|---|---|---|---|
| * | 423 | 20 | H1 | −0.9 | 0.195 | 50 | none | glossy | easy |
| * | 424 | 20 | H2 | −2.1 | 0.194 | 35 | none | glossy | easy |
| * | 425 | 20 | H3 | −2.1 | 0.178 | 30 | none | glossy | easy |
| | 426 | 21 | A2 | 0.2 | 0.174 | 100 | Note 1 | cloudy | easy |
| | 427 | 21 | B2 | 0.2 | 0.173 | 100 | Note 1 | cloudy | easy |
| | 428 | 21 | D2 | −0.04 | 0.155 | 70 | none | glossy | difficult |
| * | 429 | 21 | G1 | −0.5 | 0.156 | 60 | none | glossy | easy |
| * | 430 | 21 | G2 | −1.3 | 0.157 | 50 | none | glossy | easy |
| * | 431 | 21 | G3 | −2.3 | 0.154 | 30 | none | glossy | easy |
| * | 432 | 21 | G4 | −3.4 | 0.151 | 20 | none | glossy | easy |
| * | 433 | 21 | G5 | 0.2 | 0.157 | 70 | none | glossy | easy |
| * | 434 | 21 | G6 | −0.5 | 0.156 | 50 | none | glossy | easy |
| * | 435 | 21 | G7 | −0.5 | 0.158 | 60 | none | glossy | easy |
| * | 436 | 21 | H1 | −0.8 | 0.157 | 45 | none | glossy | easy |
| * | 437 | 21 | H2 | −1.8 | 0.152 | 40 | none | glossy | easy |
| * | 438 | 21 | H3 | −1.8 | 0.138 | 20 | none | glossy | easy |
| | 439 | 22 | A2 | 0.2 | 0.176 | 100 | Note 1 | cloudy | easy |
| | 440 | 22 | B2 | 0.2 | 0.178 | 100 | Note 1 | cloudy | easy |
| | 441 | 22 | D2 | 0.0 | 0.161 | 85 | none | glossy | difficult |
| * | 442 | 22 | G1 | −0.5 | 0.157 | 60 | none | glossy | easy |
| * | 443 | 22 | G2 | −1.1 | 0.158 | 40 | none | glossy | easy |
| * | 444 | 22 | H1 | −0.9 | 0.159 | 50 | none | glossy | easy |

Note 1) slight adhesion to the flank face

As can clearly be seen from Tables 14 and 15, in coated cutting inserts representing the examples of the present invention, recognition of the used state of the cutting-edge portion was easy, and these inserts were excellent in the attention-drawing function. In addition, in these coated cutting inserts, adhesion of the work material to the cutting edge was not observed, the state of the work material after cutting had gloss, and the flank face wear amount and the breakage ratio were also excellent.

In contrast, in coated cutting inserts that were subjected to treatment with treatment methods A2 and B2 among the coated cutting inserts in comparative examples (the insert not marked with "asterisk" in Tables), though recognition of the used state of the cutting-edge portion was possible, slight adhesion of the work material to the flank face of the cutting edge was observed, the work material after cutting was cloudy, and the flank face wear amount and the breakage ratio were also poor. Meanwhile, in the coated cutting inserts subjected to treatment method D2 among the coated cutting inserts in comparative examples, though the state of the work material after cutting or the like was good, recognition of the used state of the cutting-edge portion was difficult. Namely, the coated cutting inserts did not have the attention-drawing function.

As can be seen from the results above, it is clear that each coated cutting insert representing the example of the present invention achieved an effect superior to that of the coated cutting insert in each comparative example. Therefore, in order to suppress adhesion phenomenon to the work material in the coated cutting insert and to prevent appearance of the work material from being impaired, it is effective to form the indicating layer not on the flank face but on the rake face, and it is effective that at least one layer (the alumina layer in the above) implementing the base layer has compressive residual stress in the portion where the indicating layer is not formed, in at least a part of the area involved with cutting.

Example 8

Four types of coated cutting inserts Nos. 401-2 to 401-5 different from each other were obtained by performing the following 4 types of treatment methods G8, G9, H4, and H5 in coated cutting insert No. 401 in Example 7, instead of treatment method A2.

(Treatment Method G8)

The coating was subjected to blasting, so as to remove the indicating layer on the flank face and also the indicating layer on the rake face in the region having a width of 0.08 mm from the cutting-edge portion (this width is to be understood as in Example 3, and to be understood similarly in the treatment method below; the width at the R/2 site was set to 0.04 mm).

(Treatment Method G9)

Treatment similar to that in treatment method G8 was performed, except that the width of the region in the rake face from the cutting-edge portion was set to 0.14 mm (width at the R/2 site: 0.10 mm) in treatment method G8 above.

(Treatment Method H4)

The coating was subjected to blasting treatment, and thereafter subjected to brushing treatment, so as to remove the indicating layer on the flank face and also the indicating layer on the rake face in the region having a width of 0.16 mm from the cutting-edge portion (width at the R/2 site: 0.14 mm).

(Treatment Method H5)

Treatment similar to that in treatment method H4 was performed, except that the width of the region in the rake face from the cutting-edge portion was set to 0.17 mm (width at the R/2 site: 0.13 mm) in treatment method H4 above.

Residual stress, the state of adhesion of the work material to the cutting edge, the state of the work surface of the work material, the flank face wear amount, the breakage ratio, and readiness in recognizing the used state of the cutting edge of these coated cutting inserts were measured or observed, as in Example 7. In addition, surface relative roughness Ra (value of B/A) was measured as in Example 1. Table 16 below shows the result.

In Table 16, the insert marked with "asterisk" represents the example of the present invention. In coated cutting insert No. 401-5, it was observed that the $\alpha$-$Al_2O_3$ layer serving as the uppermost layer of the base layer was partially removed in the cutting-edge portion at the R/2 site, and the underlying TiCN (MT-CVD) layer was exposed at the surface. This coated cutting insert No. 401-5 exhibited the highest cutting edge strength in the cutting test.

As can be seen from Table 16, it is clear that each coated cutting insert representing the example of the present invention (Nos. 401-2 to 401-5) achieved an effect superior to that of the coated cutting insert in comparative example (No. 401). Therefore, in order to suppress adhesion phenomenon that occurs between the work material and the coated cutting insert and to prevent appearance of the work material from being impaired, it is effective to form the indicating layer not on the flank face but on the rake face, and to set B/A to 1 or smaller when surface relative roughness Ra of the particular area of the rake face (the breaker recess portion or the land portion) is set to A$\mu$m and surface relative roughness Ra of the flank face is set to B$\mu$m. In addition, it is effective that at least one layer (for example, the alumina layer in the above) implementing the base layer has compressive residual stress in the portion where the indicating layer is not formed, in at least a part of the area involved with cutting (that is, the region subjected to blasting or combination of blasting and brushing in the above).

Though each example above has shown the coated cutting insert for turning and milling, the present invention is naturally applicable to the coated cutting insert for drilling, for end milling, for working with metal saw, for working with gear cutting tool, for working with reamer, for working with tap, or for crankshaft pin milling, and the effect of the present invention is obtained.

Though the embodiments and examples of the present invention have been described above, combination of embodiments and examples described above as appropriate is originally intended.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A coated cutting insert being any one of a drill, an end mill, a coated insert for milling or turning, a metal saw, a gear cutting tool, a reamer, a tap, and an insert for crankshaft pin milling, comprising:

TABLE 16

| Coated cutting insert No. | Coating No. | Treatment Method | Surface Relative Roughness Ra (B/A) | Residual Stress (GPa) | Flank Face Wear Amount (mm) | Breakage Ratio (%) | State of Adhesion of Work Material to Cutting Edge | State of Work Surface of Work Material | Recognition of Used State of Cutting Edge |
|---|---|---|---|---|---|---|---|---|---|
| 401 | 18 | A2 | 1.2 | 0.2 | 0.242 | 100 | Note 1 | cloudy | easy |
| * 401-2 | 18 | G8 | 0.9 | −0.5 | 0.206 | 55 | none | glossy | easy |
| * 401-3 | 18 | G9 | 0.8 | −0.5 | 0.201 | 50 | none | glossy | easy |
| * 401-4 | 18 | H4 | 0.7 | −0.5 | 0.198 | 45 | none | glossy | easy |
| * 401-5 | 18 | H5 | 0.5 | −0.5 | 0.186 | 20 | none | glossy | easy |

Note 1) slight adhesion to the flank face a substrate;

a through hole centrally positioned in the substrate and extending from an upper surface to a bottom surface of the substrate;

a base layer formed on said substrate; and an indicating layer formed on a part of said base layer that is formed on said upper surface of said substrate, wherein:

said substrate has at least one cutting-edge portion, at least one rake face, and at least one flank face, said rake face formed on the upper surface of the substrate and lying between the cutting-edge portion and an outer edge of the through hole, said flank face continues to said rake face with said cutting-edge portion lying therebetween, said indicating layer can identify which cutting-edge portion has been used, said rake face has a chip breaker and has either a breaker recess portion or a land portion, said breaker recess portion being located adjacent to said cutting-edge portion and inclined from said cutting-edge portion toward a central portion of the rake face to form a concave shape, and said land portion being located adjacent to said cutting-edge portion and formed horizontally from said cutting-edge portion toward the central portion of the rake face, said base layer exhibits a color different from that of said indicating layer, said indicating layer is formed in at least a part of a surface including said cutting-edge portion and said rake face, but is not formed on said flank face, an outermost layer of said indicating layer is implemented by a layer formed from at least one metal element selected from the group consisting of Ti, Zr, Hf, V, Nb, Ta, Cr, Mo, W, Al, Si, Cu, Pt, Au, Ag, Pd, Fe, Co, and Ni or an alloy containing that metal, or formed from a compound of at least one element selected from the group consisting of Ti, Zr, Hf, V, Nb, Ta, Cr, Mo, W, Al, and Si and at least one element selected from the group consisting of carbon, nitrogen, oxygen, and boron, and when a surface relative roughness Ra of said breaker recess portion or said land portion of said rake face is set to A$\mu$m and a surface relative roughness Ra of said flank face is set to B$\mu$m, relation of B/A $\leq$0.9 is established.

2. The coated cutting insert according to claim 1, wherein said base layer is characterized in that at least one layer constituting said base layer has compressive residual stress in a portion on which said indicating layer is not formed, in at least a part of an area involved with cutting.

3. The coated cutting insert according to claim 2, wherein said compressive residual stress is stress of which absolute value is at least 0.1GPa.

4. The coated cutting insert according to claim 1, wherein said indicating layer is formed in at least a part of an area involved with cutting of said rake face.

5. The coated cutting insert according to claim 1, wherein said indicating layer is a layer more susceptible to wear than said base layer.

6. The coated cutting insert according to claim 1, having a plurality of cutting-edge portions available for use.

7. The coated cutting insert according to claim 1, wherein said substrate is formed from any one of cemented carbide, cermet, high-speed steel, ceramics, sintered cubic boron nitride, sintered diamond, sintered silicon nitride, and a mixture of aluminum oxide and titanium carbide.

8. The coated cutting insert according to claim 1, wherein an outermost layer of said base layer is implemented by an $Al_2O_3$ layer or a layer containing $Al_2O_3$.

* * * * *